United States Patent
Yin

(10) Patent No.: US 12,381,719 B2
(45) Date of Patent: Aug. 5, 2025

(54) DATA TRANSMISSION METHOD, AND ELECTRONIC DEVICE

(71) Applicant: GUANGDONG OPPO MOBILE TELECOMMUNICATIONS CORP., LTD., Guangdong (CN)

(72) Inventor: Kangkai Yin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 206 days.

(21) Appl. No.: 18/090,910

(22) Filed: Dec. 29, 2022

(65) Prior Publication Data
US 2023/0171090 A1    Jun. 1, 2023

Related U.S. Application Data

(63) Continuation of application No. PCT/CN2021/110617, filed on Aug. 4, 2021.

(30) Foreign Application Priority Data

Aug. 31, 2020    (CN) .......................... 202010900055.3

(51) Int. Cl.
*H04L 9/08* (2006.01)
*H04L 9/14* (2006.01)

(52) U.S. Cl.
CPC .......... *H04L 9/0838* (2013.01); *H04L 9/0825* (2013.01); *H04L 9/14* (2013.01)

(58) Field of Classification Search
CPC ..... H04L 9/08; H04L 9/14; H04L 9/12; H04L 9/30; H04L 9/085; H04L 9/0838;
(Continued)

(56) References Cited

U.S. PATENT DOCUMENTS 9,402,177 B2 *   7/2016   Hawkes ................ H04W 12/06
9,419,951 B1 *   8/2016   Felsher ................. H04L 9/3249
(Continued)

FOREIGN PATENT DOCUMENTS

CN    101459506 A    6/2009
CN    101488853 A    7/2009
(Continued)

OTHER PUBLICATIONS

Internet Engineering Task Force (IETF) E. Rescorla Request for Comments: 8446 Mozilla Obsoletes: 5077, 5246, 6961 Aug. 1, 2018 Updates: 5705, 6066.*

(Continued)

*Primary Examiner* — Sargon N Nano
(74) *Attorney, Agent, or Firm* — Young Basile Hanlon & MacFarlane, P.C.

(57) ABSTRACT

Described is a data transmission method, which is applied to a client and comprises: sending a first client greeting message, the first client greeting message being used to indicate a first handshake-key mode that the client can support; obtaining a first server feedback message sent by a server on the basis of the first client greeting message, the first server feedback message being used to indicate a second handshake-key mode determined by the server, and the first server feedback message comprising a request to resend the greeting message or a server greeting message; and determining a first client shared key, and performing target data transmission according to the first client shared key. Further described are a data transmission device and a storage medium.

20 Claims, 12 Drawing Sheets

(58) Field of Classification Search
CPC ... H04L 9/0825; H04L 9/3236; H04L 63/045; H04L 67/14
USPC .......................................................... 713/171
See application file for complete search history.

(56) References Cited

U.S. PATENT DOCUMENTS

| | | | | |
|---|---|---|---|---|
| 9,923,923 | B1* | 3/2018 | Sharifi Mehr | H04L 63/0428 |
| 9,973,481 | B1 | 5/2018 | Sharifi Mehr | |
| 10,129,228 | B1* | 11/2018 | Mobarak | H04L 63/083 |
| 11,626,974 | B2* | 4/2023 | Zimmerman | H04L 9/3297 |
| | | | | 713/171 |
| 2006/0192416 | A1* | 8/2006 | Wolfe | A47C 31/00 |
| | | | | 297/217.3 |
| 2006/0209789 | A1* | 9/2006 | Gupta | H04L 69/04 |
| | | | | 370/352 |
| 2010/0161962 | A1* | 6/2010 | Lim | H04L 63/062 |
| | | | | 713/153 |
| 2013/0282865 | A1* | 10/2013 | Baptist | H04L 67/51 |
| | | | | 709/217 |
| 2016/0021110 | A1* | 1/2016 | Sugano | H04L 63/0823 |
| | | | | 713/171 |
| 2017/0054555 | A1* | 2/2017 | Yuan | H04L 63/061 |
| 2018/0109494 | A1* | 4/2018 | Yu | H04L 63/1441 |
| 2020/0153618 | A1 | 5/2020 | Bhattacharya et al. | |
| 2022/0104011 | A1* | 3/2022 | Fischer | H04W 12/06 |
| 2022/0255742 | A1* | 8/2022 | Koziel | H04L 9/14 |

FOREIGN PATENT DOCUMENTS

| | | |
|---|---|---|
| CN | 102447690 A | 5/2012 |
| CN | 106411528 A | 2/2017 |
| CN | 103795534 B | 8/2017 |
| WO | 2015062314 A1 | 5/2015 |
| WO | 2017152423 A1 | 9/2017 |
| WO | 2018177905 A1 | 10/2018 |
| WO | WO-2022019886 A1 * | 1/2022 ............... H04L 9/14 |

OTHER PUBLICATIONS

Chinese First Office Action with English Translation for CN Application 202010900055.3, mailed Jul. 5, 2022 (22 pages).
International Search Report and Written Opinion with English Translation for PCT Application PCT/CN2021/110617 mailed Oct. 27, 2021. (13 pages).
Zhao Min, "Research on End-to-End Security Mechanism in Internet of Things", Thesis Submitted to Nanjing University of Posts and Telecommunications for the Degree of Master of Engineering, Apr. 2017. (111 pages).
Granjal et al., "End-to-end transport-layer security for Internet-integrated sensing applications with mutual and delegated ECC public-key authentication", Networking Conference 1569702997, 2013. (9 pages).
Wei et al., "EAP-AKA Scheme of Identity-Based Cryptograph", Computer Engineering, vol. 36, No. 17, Sep. 2010. (18 pages).
Extended European Search Report for EP Application 21860084.9 mailed Nov. 8, 2023. (9 pages).
Rescorla E., "The Transport Layer Security (TLS) Protocol Version 1.3", Internet Engineering Task Force (IETF), RFC 8446, Aug. 1, 2018, XP055863908, https://www.rfc-editor.org/rfc/pdfrfc/rfc8446.txt.pdf.
Cragie et al., "Elliptic Curve J-PAKE Cipher Suites for Transport Layer Security (TLS); draft-cragie-tls-ecjpake-01 .txt", Internet Engineering Task Force (IETF), Jun. 22, 2016, pp. 1-25.
Harkins et al., "Secure Password Ciphersuites for Transport Layer Security (TLS); rfc8492.txt", Internet Engineering Task Force (IETF), RFC 8492, Feb. 21, 2019, pp. 1-40, XP015130680, <https://tools.ietf.org/html/rfc8492>.
Dragomir et al., "A Survey on Secure Communication Protocols for IoT Systems", 2016 International Workshop on Secure Internet of Things (SIOT), IEEE, Sep. 26, 2016, pp. 47-62, XP033089808.
Rescorla, "The Transport Layer Security (TLS) Protocol Version 1.3; Sections 2-11 of the main text; 1-6, 8-13, 15-18", Internet Engineering Task Force (IETF) Request for Comments: 8446, Aug. 31, 2018, 160 pages.
Chinese First Office Action, Chinese Application No. 202310305681.1, mailed May 20, 2025, 12 pages.

* cited by examiner

DATA TRANSMISSION METHOD, AND ELECTRONIC DEVICE

CROSS-REFERENCE TO RELATED APPLICATION(S)

The present application is a continuation-application of the International patent application No. PCT/CN2021/110617, filed on Aug. 4, 2021, which claims the priority of the Chinese patent application No. 202010900055.3, filed on Aug. 31, 2020, and the entire contents of both of which are incorporated herein.

TECHNICAL FIELD

The present disclosure relates to the field of communication security, and in particular to a data transmission method, and an electronic device.

BACKGROUND

Before an internet-of-things (IoT) device can transmit data, taking into account security of data transmission, a client and a server may handshake a shared key through interaction and then transmit data through the shared key. Therefore, how to handshake the shared key may be a technical problem to be solved.

SUMMARY

In a first aspect, the present disclosure provides a data transmission method applied to a client, and the method includes:
  Sending a first client greeting message, wherein the first client greeting message is configured to indicate a first handshake-key mode that is capable of being supported by the client;
  Obtaining a first server feedback message sent by a server based on the first client greeting message, wherein the first feedback message is configured to indicate the second handshake-key mode determined by the server, the first server feedback message comprises a request of resending a greeting message or a server greeting message;
  In response to the first handshake-key mode including the second handshake-key mode, determining a first client shared key based on the second handshake-key mode, and transmitting target data based on the first client shared key.

In a second aspect, the present disclosure provides a data transmission method applied to a server, and the method includes:
  receiving a first client greeting message sent from a client, wherein the first client greeting message is configured to indicate a first handshake-key mode that is capable of being supported by the client;
  determine a second handshake-key mode selected by the server based on the first handshake-key mode, sending the second handshake-key mode to the client via the first server feedback message; and
  In response to the first handshake-key mode including the second handshake-key mode, determining a first server shared key based on the second handshake-key mode, transmitting target data transfer based on the first server shared key.

In a third aspect, an electronic device is provided and includes a memory, a processor, and an executable program stored in the memory and capable of being run by the processor. The processor, when running the executable program, is configured to perform any of the above methods.

DETAILED DESCRIPTION

The present disclosure is described in further detail below by referring to the accompanying drawings and embodiments. It shall be understood that the specific embodiments described herein are intended to explain the present disclosure only and but do not limit the present disclosure.

Before an IoT device operates at a functional level, for security reasons, configuration may usually be performed firstly. The configuration means that identities of two parties are verified by means of interaction, and a key for data cipher may be generated in the process of interaction. Since most of Internet of Things (IoT) devices have connection abilities via wireless, such as WiFi, Bluetooth Low Energy (BLE), and so on, the devices may communicate on a current wireless network after the configuration. Therefore, the above process is referred to as network configuration.

In the art, there are two main provisioning protocols, an ECDH-based network configuration protocol and an ECPAKE-based network configuration protocol. General flow charts are shown in FIG. 1 and FIG. 2.

Figure 1:
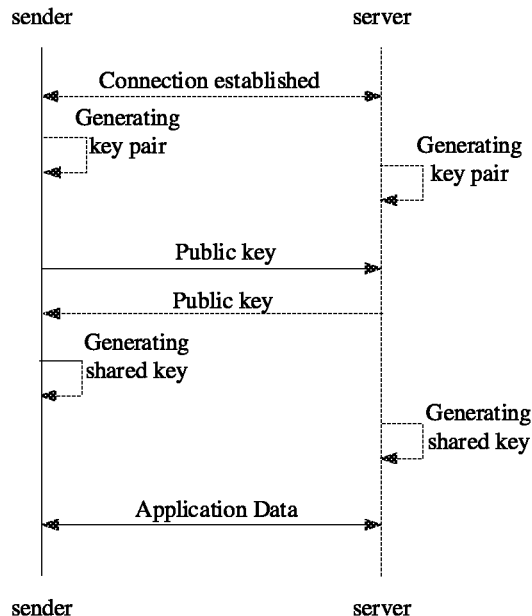
FIG. 1 is a flow chart of a network configuration protocol based on ECDH in the related art.

FIG. 1 is a flow chart of a network configuration protocol based on ECDH in the related art.

As shown in FIG. 1, after a first client establishes a connection with a server, a pair of keys are generated respectively by the first client and the server. Further, a shared key is generated based on a public key of interaction. After the shared key is generated, the network configuration is considered as being completed, and application layer data may be transmitted (taking the shared key to perform symmetric cipher).

Figure 2:
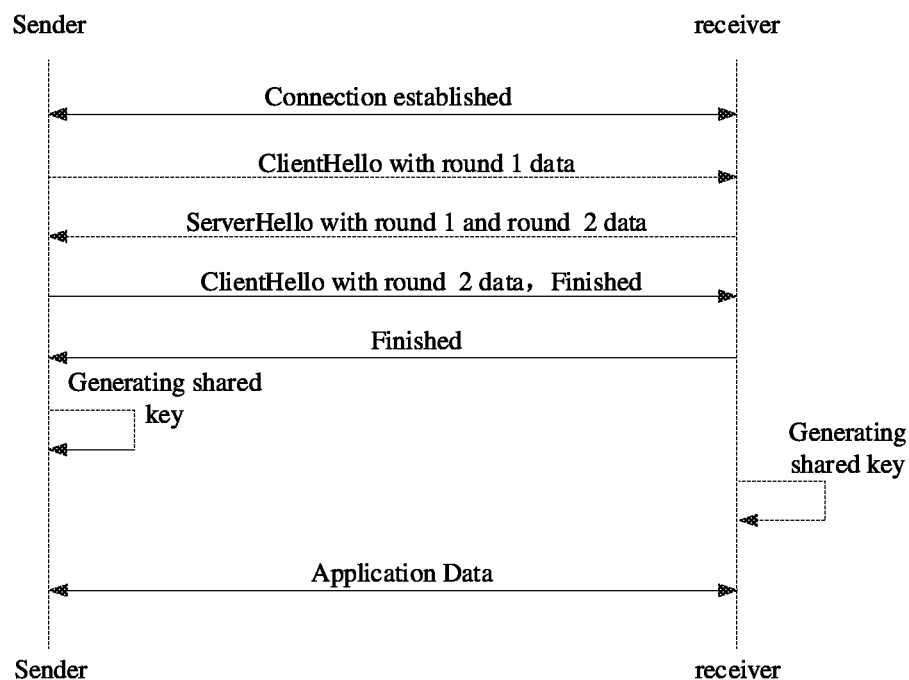
FIG. 2 is a flow chart of a network configuration protocol based on ECJPAKE in the related art.

FIG. 2 is a flow chart of a network configuration protocol based on ECJPAKE in the related art.

As shown in FIG. 2, connection is established between the first client and the server, a handshaking stage is entered, the public keys are exchanged, and a shared key is generated. After the shared key is generated, the network configuration is considered as being completed, and application layer data may be transmitted (taking the shared key to perform symmetric cipher).

However, in the art, for the ECDH-based or the ECJPAKE-based network configuration protocols, support of a device may not be flexible or comprehensive. In addition, during interaction based on current standard processes, the amount of data may be large, and a burden for the BLE device may be large.

As awareness of security and privacy improved, security technologies are becoming more and more important for IoT products. Usually, on the BLE device, different handshaking processes are performed based on a security level of the BLE device. Specifically, following operations are included.

(1) for a low security level: a random number provides unpredictability, symmetric keys are provided, symmetric cipher and decipher are performed (AES-128).

(2) for a high security level: a random number provides unpredictability, asymmetric key exchange (ECDH key exchange) is performed, symmetric cipher and decipher on messages (AES-128) are performed. A message sequence number is added to a head of the message for preventing message replaying, and a certificate is provided for authenticating an identity.

In addition, the applicant also found that, for a device having a personal identification number (PIN) code, the PIN code may not be sufficiently protected and may be divulged. In addition, once the key is generated, the key may be used throughout its life cycle, no updating mechanism is available.

Based on the problems in the secure communication, the present disclosure provides a data transmission method that can solve the technical difficulties and shortcomings that cannot be overcome in the related art.

Figure 3:
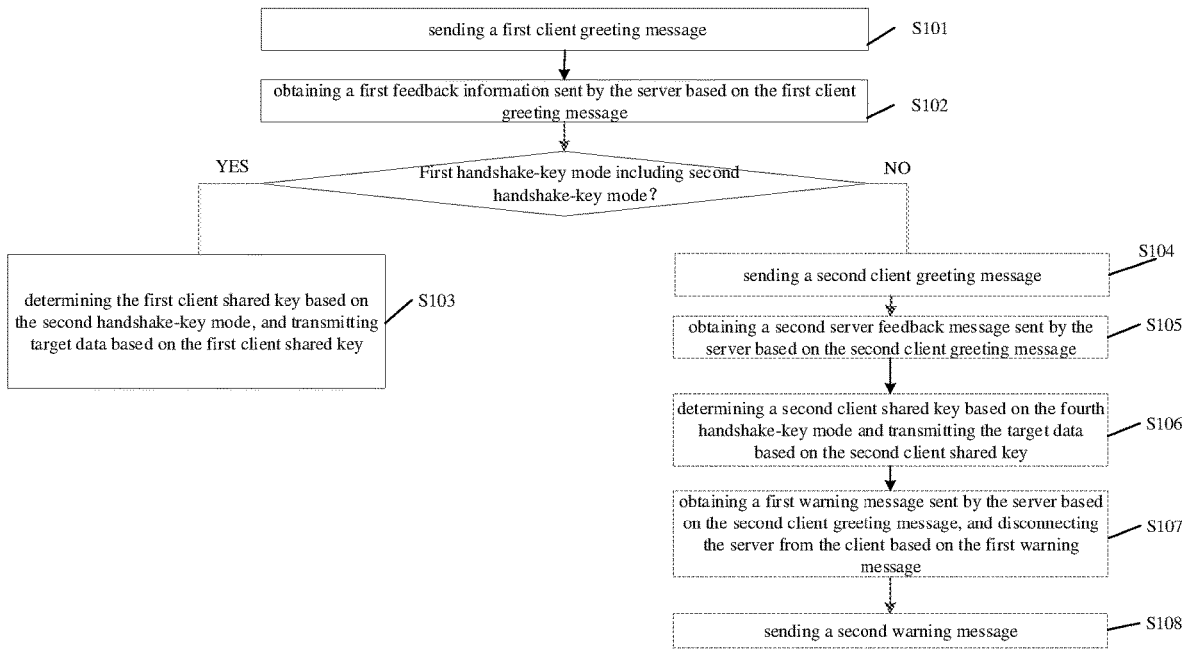
FIG. 3 is a flow chart of a data transmission method performed by a client according to an embodiment of the present disclosure.

FIG. 3 is a flow chart of a data transmission method performed by a client according to an embodiment of the present disclosure. The method will be illustrated based on each operation.

In an operation S101, sending a first client greeting message.

In some embodiments, a client sends the first client greeting message to a server. The first client greeting message is configured to indicate a first handshake-key mode that can be supported by the client.

In some embodiments, the client sends the first client greeting message to the server. The first client greeting message includes a first information, and the first information is configured to indicate the first handshake-key mode that can be supported by the client.

In some embodiments, the first handshake-key mode includes handshaking a key by taking an ECDH-based network configuration protocol and/or taking an ECJPAKE-based network configuration protocol.

In some embodiments, the first information includes a first set of cipher suites. The first set of cipher suites includes a set of at least one cipher suite that can be supported by the client.

In some embodiments, the first client greeting message may further include: an cipher suite field. The cipher suite field is configured to indicate some or all of the cipher suite parameters supported by the client.

In some embodiments, the first information may further include a first set of cipher curves. The first set of cipher curves includes a set of at least one cipher curve that can be supported by the client.

In some embodiments, the first client greeting message may further include: an cipher curve field. The cipher curve field is configured to indicate some or all of the cipher curve parameters supported by the client.

In some embodiments, the first client greeting message further include: a first public key. The first public key includes, in the condition that the client supports the ECDH-based network configuration protocol, a public key determined by any cipher suite in the first cipher suite set and/or any cipher curve in the first cipher curve set. Different cipher suites and/or different cipher curves determine different public keys.

In some embodiments, the first client greeting message further includes: a first protocol identifier set. The first protocol identifier set includes a protocol identifier corresponding to at least one protocol version. The protocol version and the protocol identifier are in one-to-one correspondence. The first protocol identifier set indicates a set of protocol versions supported by the client.

In some embodiments, the first client greeting message may further include a protocol version field. The protocol version field is configured to indicate some or all of the protocol version parameters supported by the client.

In some embodiments, the first client greeting message further includes a first public key list. The first public key list of the first client greeting message is NULL.

In an operation S102, obtaining a first feedback information sent by the server based on the first client greeting message.

To be noted that the client in the embodiments of the present disclosure refers to a device (or an APP) that actively initiates a connection, or refers to an active connection end in the present disclosure. While connecting, the client proves its control to the server. The server refers to a device (or an APP) that is passively connected or refers to a passive connection side in the present disclosure. While connecting, the server authenticates an identity of the client and verifies that the client has the control. Each of the client and the server may be a server, a terminal device, a TV, a speaker, and other IoT devices. The connection between the client and the server may be a connection established through a wired network, a wireless network, or a mobile network.

In some embodiments, the client may be the active connection end. The client may be a Bluetooth low-power device or an electronic device such as a handheld terminal, a wearable terminal, a personal laptop, a tablet computer, and so on. The server may be the passive connection end. The server may be a Bluetooth low-power device, such as a blood pressure measuring device, a temperature measuring device, a blood glucose monitoring device that are applied in the field of monitoring and care; or a fitness device sensor, a heart rhythm measuring device, a positioning device, a speed measuring device, a weight measuring device that are applied in the field of sports and fitness; or a switching device, a lighting device, a smart door lock, an electric curtain, and a sweeping robot that are applied in the field of smart home appliances. In some embodiments, the client obtains the first server feedback message sent by the server based on the first client greeting message. The first server feedback message includes a first feedback message, and the first feedback message is configured to indicate a second handshake-key mode determined by the server.

In some embodiments, the first feedback message includes at least one of: a first cipher suite, a first cipher curve, a first protocol identifier, and a second public key, in the condition that the first set of cipher suites included in the first client greeting message includes at least one cipher suite supported by the server, the first set of cipher curves included in the first client greeting message includes at least one cipher curve supported by the server, or the first set of protocol identifiers included in the first client greeting message includes the protocol identifier corresponding to the at least one protocol version supported by the server; and in the condition that the server determines the second handshake-key mode as handshaking the key using the ECDH-based network configuration protocol. The first set of cipher suites includes the first cipher suite, the first cipher suite includes any one of the at least one cipher suite supported by the server; the first set of cipher curves includes the first cipher curve, the first cipher curve includes any of at least one cipher curve supported by the server; the first set of protocol identifiers includes the first protocol identifier, the first protocol identifier includes the protocol identifier corresponding to any of the at least one protocol version supported by the server. The second public key is determined based on at least one of the first cipher suite, the first cipher curve, and the first protocol identifier. In some embodiments, the first feedback message includes: the first cipher suite, the first cipher curve, the first protocol identifier, and the first public key list, in the condition that the first set of cipher suites included in the first client greeting message includes at least one cipher suite supported by the server, the first set of cipher curves included in the first client greeting message includes at least one cipher curve supported by the server, or the first set of protocol identifiers included in the first client greeting message includes the protocol identifier corresponding to the at least one protocol version supported by the server, the server determines the second handshake-key mode as handshaking the key using the ECJPAKE-based network configuration protocol. The first set of cipher suites includes the first cipher suite, the first cipher suite includes any one of the at least one cipher suite supported by the server. The first set of cipher curves includes the first cipher curve, the first cipher curve includes any one of at least one cipher curve supported by the server. The first set of protocol identifiers includes the first protocol identifier, the first protocol identifier includes a protocol identifier corresponding to any of the at least one protocol version supported by the server. The second public key is determined based on at least one of the first cipher suite, the first cipher curve, and the first protocol identifier. The first public key list includes a public key pair sent from the server to the client for determining the first client shared key.

In some embodiments, the first feedback message includes: a second cipher suite, a second cipher curve, and a second protocol identifier, when at least one of the following is met: the first set of cipher suites included in the first client greeting message does not include the at least one cipher suite supported by the server; the first set of cipher curves included in the first client greeting message does not include the at least one cipher curve supported by the server; or the first set of protocol identifiers included in the first client greeting message does not include the protocol identifier corresponding to the at least one protocol version supported by the server. The first set of cipher suites does not include the second cipher suite, the second cipher suite includes any of the at least one cipher suite supported by the server. The first set of cipher curves does not include the second cipher curve, the second cipher curve includes any of the at least one cipher curve supported by the server. The first set of protocol identifier does not include the second protocol identifier, the second protocol identifier includes the protocol identifier corresponding to any of the at least one protocol version supported by the server.

For example, the first feedback information includes a second cipher suite, a second cipher curve, and a second protocol identifier, and the second cipher suite, the second cipher curve, and the second protocol identifier are determined by the server based on performance of the server itself, in the condition that the first set of cipher suites does not include the cipher suite supported by the server, the first set of cipher curves does not include the curve supported by the server, and the first set of protocol identifiers does not include the protocol identifier corresponding to the protocol version supported by the server.

In some embodiments, the first feedback information includes the second cipher curve, the second protocol identifier, and the first cipher suite, where the second cipher curve and the second protocol identifier are determined by the server based on the performance of the server itself, and the first cipher suite is determined by the server based on the first client greeting message, in the condition that the first set of cipher suites includes the cipher suite supported by the server, the first set of cipher curves does not include the cipher curve supported by the server, and the first set of protocol identifiers does not include the protocol identifier corresponding to the protocol version supported by the server.

In an operation S103, determining the first client shared key based on the second handshake-key mode in response to the first handshake-key mode including the second handshake-key mode, and transmitting target data based on the first client shared key.

In some embodiments, the first client shared key is determined based on the second handshake-key mode in the condition that the first handshake-key mode includes the second handshake-key mode, and the target data is transmitted based on the first client shared key.

In some embodiments, the first handshake-key mode including the second handshake-key mode may include the following. The first handshake-key mode includes the second handshake-key mode corresponding to the first cipher suite carried in the first server feedback message, the first cipher profile carried in the first server feedback message, and the first protocol identifier carried in the first server feedback message, in the condition that the first set of cipher suites includes the first cipher suite; the first set of cipher curves includes the first cipher curve; and the first set of protocol identifiers includes the first protocol identifier.

In some embodiments, the first handshake-key mode including the second handshake-key mode may include the following. A protocol version parameter of the protocol version field of the first client greeting message includes a protocol version parameter of the protocol version field of the first server feedback message. An cipher suite parameter of the cipher suite field of the first client greeting message includes a cipher suite parameter of the cipher suite field of the first server feedback message; an cipher parameter of the cipher suite field of the first client greeting message includes an cipher suite parameter of the cipher suite field of the first server feedback message. The cipher curve parameter of the cipher curve field of the first client greeting message includes the cipher suite parameter of the cipher suite field of the first server feedback message.

In some embodiments, determining the first client shared key based on the second handshake-key mode includes a scenario 1 and a scenario 2, which will be described in detail in the following embodiments.

In some embodiments, the scenario 1 includes the following. The second handshake-key mode is handshaking the key by using the ECDH-based network configuration protocol. Further, determining the first client shared key based on the second handshake-key mode includes: handshaking the key by using the ECDH-based network configuration protocol.

In some embodiments, the scenario 2 includes the following. The second handshake-key mode is the ECDPAKE-based network configuration protocol. Further, determining the first client shared key based on the second handshake-key mode includes: handshaking the key by using the ECDPAKE-based network configuration protocol.

In an operation S104, sending a second client greeting message in response to the first handshake-key mode not including the second handshake-key mode.

In some embodiments, the first handshake-key mode not including the second handshake-key mode, includes the following. The first set of cipher suites included in the first client greeting message does not include the second cipher suite carried in the first server feedback message. Alternatively, the first set of cipher curves included in the first client greeting message does not include the second cipher curve carried in the first feedback message. Alternatively, the first set of protocol identifiers included in the first client greeting message does not include the second protocol identifier carried in the first feedback message. That is, the first handshake-key mode does not include the second handshake-key mode that is corresponding to the cipher suit carried in the first server feedback message, the cipher curve carried in the first server feedback message, and the protocol identifier carried in the first server feedback message.

In some embodiments, the client sending the second client greeting message includes the following. The client sends the second client greeting message to the server. The second client greeting message includes the second message, and the second message is configured to indicate a third handshake-key mode supported by the client.

In some embodiments, the second message includes a second set of cipher suites that can be supported by the client and/or a second set of cipher curves that can be supported by the client. At least one cipher suite included in the first set of cipher suites is completely different from at least one cipher suite included in the second cipher suite set. At least one cipher curve included in the first set of cipher curves is completely different from at least one cipher curve included in the second set of cipher curves.

In some embodiments, the second client greeting message further includes: a fourth public key. The fourth public key includes, in response to the client being capable of supporting the ECDH-based network configuration protocol, a public key determined by any one cipher suite of the second set of cipher suites and/or any one cipher curve of the second set of cipher curves.

In some embodiments, the second client greeting message further includes: a second set of protocol identifiers. The second set of protocol identifiers includes a protocol identifier corresponding to at least one protocol version, the protocol version and the protocol identifier are in one-to-one correspondence, and the second set of protocol identifiers indicates a set of protocol versions supported by the client.

In some embodiments, the second client greeting message further includes: a second public key list. The second public key list of the second client greeting message is NULL.

In some embodiments, an operation S105 is performed in response to the server supporting the third handshake-key mode. An operation S107 is performed in response to the server being unable to support the third handshake-key mode.

In the operation S105, obtaining a second server feedback message sent by the server based on the second client greeting message.

In some embodiments, the client obtains the second server feedback message sent by the server based on the second client greeting message. The second server feedback message includes a second feedback message. The second feedback message is configured to indicate a fourth handshake-key mode determined by the server, a detailed process of the present operations is similar to the operation S102 and will not be repeated here.

In an operation S106, determining a second client shared key based on the fourth handshake-key mode and transmitting the target data based on the second client shared key.

In some embodiments, a detailed process for determining the second client shared key based on the fourth handshake-key mode and transmitting the target data based on the second client shared key may be similar to the operation S103 and will not be repeated here.

In an operation S107, obtaining a first warning message sent by the server based on the second client greeting message, and disconnecting the server from the client based on the first warning message.

In some embodiments, the client obtains the first warning message sent by the server based on the second client greeting message, and is disconnected form the server based on the first warning message.

In some embodiments, the server sends the first warning message to the client, in the condition that the server receives the second client greeting message and determines that the server does not support the at least one cipher suite included in the second set of cipher suites; or, the server does not support the at least one cipher curve included in the second set of cipher curves; or, the server does not support the at least one protocol version corresponding to the protocol identifier included in the second set of protocol identifiers. The first warning message is configured to indicate disconnecting the client from the server.

In some embodiments, the method further includes an operation S108 of sending a second warning message.

In some embodiments, in the first server feedback message received by the client, in the condition that the first server feedback message includes more than two cipher curves or more than two cipher suites or more than two version identifiers, the client sends the second warning message to the server and is disconnected from the server; and the second warning message is configured to indicate the client being disconnected from the server. The condition of the first server feedback message including more than two cipher curves or more than two cipher suites or more than two version identifiers, indicates that the client is maliciously attacked by a third party or the server has an error, and in this condition, the client sends the second warning message and is disconnected from the server.

In some embodiments, in the second server feedback message received by the client, in the condition that the second server feedback message includes more than two cipher curves or more than two cipher suites or more than two version identifiers, the client sends the second warning message to the server and is disconnected from the server, and the second warning message is configured to indicate the client being disconnected from the server.

Accordingly, the present disclosure provides a flexible data transmission method. A client, which has poor performance and low security requirements, may use the ECDH-based network configuration protocol for data transmission. A client, which has better performance and high security requirements may use the ECPAKE-based network configuration protocol for data transmission. A data transmission process does not need to be selected by a developer or selected in advance. The client or the server may determine the transmission process by itself based on actual needs. Furthermore, in the present disclosure, for the client having requirements of a high security level, a PIN code of the client is combined with the transmission process, difficulty of deciphering the PIN code may be increased, and security of data transmission may be improved. In addition, in the present disclosure, each frame of the message transmitted by the client and/or the server is involved in computing the hash value of verification data, such that handshaking data may not be tampered, and security and reliability of a handshaking process may be improved.

Figure 4:
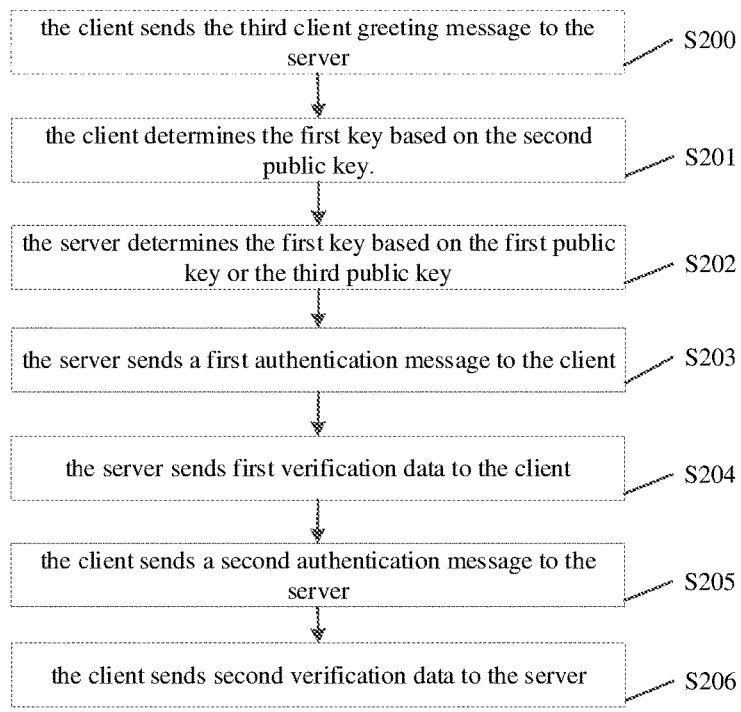
FIG. 4 is a flow chart of handshaking a shared key by taking the network configuration protocol of the ECDH according to an embodiment of the present disclosure.
Figure 5:
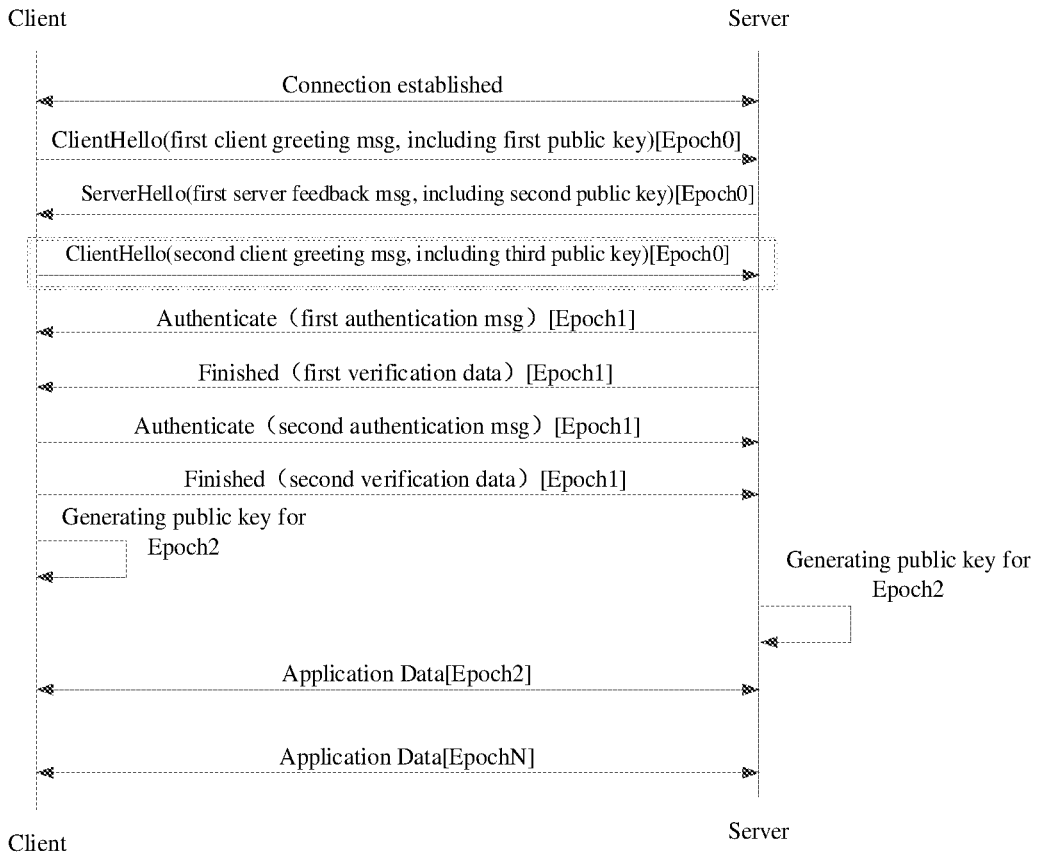
FIG. 5 is a flow chart of a detailed process of handshaking the shared key by taking the network configuration protocol of the ECDH according to an embodiment of the present disclosure.

FIG. 4 is a flow chart of handshaking a shared key by taking the network configuration protocol of the ECDH according to an embodiment of the present disclosure; and FIG. 5 is a flow chart of a detailed process of handshaking the shared key by taking the network configuration protocol of the ECDH according to an embodiment of the present disclosure. Embodiments will be illustrated in the following by referring to FIG. 4 and FIG. 5.

The present embodiment corresponds to the scenario 1 in the operation S103.

In some embodiments, based on the operation S102, the client obtains the first server feedback message from the server, and an operation S200 may be performed, in the condition that the second key transmission mode is determined as handshaking the shared key by using the ECDH-based network configuration protocol based on the first feedback message, and in response to the first cipher curve, which is used by the client to determine the second public key, being different from a cipher curve, which is used by the client to determine the first public key.

In an operation S200, the client sends the third client greeting message to the server.

In some embodiments, the third client greeting message includes at least one of: the first cipher suite, the first cipher profile, and the first protocol identifier.

In some embodiments, the third client greeting message may further include: a third public key. The third public key is determined based on the first cipher suite and/or the first cipher curve.

In some embodiments, the third client greeting message may further include: a first numeric sequence formed by combining the third public key with a first random sequence. The first random sequence is randomly generated by the client.

For example, the third public key may include: ####. The first random sequence may include **** (the first random sequence may be a random sequence consisting of a number, a capital letter, a lower case letter, and a symbol). The numeric sequence may include ####****. The first random sequence may be known only to the client and is configured to increase complexity of transmitting the first public key, preventing the first public key from being obtained based on the first numeric sequence after the first numeric sequence being intercepted by a third party. The first random sequence is not involved in determining the first key. After the server receives the first numeric sequence, the first random sequence may be removed from the first numeric sequence, and the third public key may be obtained, such that the first key may be determined.

In some embodiments, as shown in FIG. 5, the third client greeting message is sent to the server via a ClientHello message.

In an operation S201, the client determines the first key based on the second public key.

In some embodiments, the client determining the first key based on the second public key includes the following. The client determines the first key based on the second public key in the first server feedback message. The second client removes a second random sequence, which is generated by the server and is included in the first server feedback message, obtains the second public key, and determines the first key based on the second public key. s In some embodiments, the method of determining the first key based on the second public key is the same as a method of determining a key based on a public key available in the related art, and will not be described in detail here.

In some embodiments, as shown in FIG. 5, the first server feedback message is sent to the server via a ServerHello message.

In an operation S202, the server determines the first key based on the first public key or the third public key.

In some embodiments, the server determines the first key based on the first public key in the first client greeting message in the condition that the first cipher curve for determining the second public key is the same as an cipher curve for determining the first public key. The server removes the random sequence from the first client greeting message, obtains the first public key, and determines the first key based on the first public key.

In some embodiments, the server determines the first key based on the third public key in the first numeric sequence in the condition that the first cipher profile for determining the second public key is different from the cipher curve for determining the first public key. The server removes the first random sequence from the first numeric sequence, obtains the third public key, and determines the first key based on the third public key.

In an operation S203, the server sends a first authentication message to the client.

In some embodiments, the server sends the first authentication message to the client. The first authentication message includes a certificate of the server. The first authentication message is configured to verify the identity of the server by the client.

In some embodiments, as shown in FIG. 5, the first authentication information is sent to the client via an Authenticate message.

In some embodiments, the first authentication information may be an X509 certificate or an integer customized by the server.

In an operation S204, the server sends first verification data to the client.

In some embodiments, the server sends the first verification data to the client. The first verification data includes a set of hash values of all frames of the message sent and/or received by the client. For example, the first verification data=hash(M1||M2|| . . . ||Mn), each of the M1, M2, . . . , and Mn is one frame of the message sent and/or received by the client, and the M1, M2, . . . , and Mn forms all frames of the message. For example, in the present embodiment, the first verification data includes: a hash value of the first client greeting message, a hash value of the first server feedback message, and a hash value of the first authentication message, in the condition that the client sends the first client greeting message to the server, the server sends the first server feedback message to the client, and the server sends the first authentication message to the client.

In some embodiments, as shown in FIG. 5, the first verification data is sent to the client via a Finished message.

In some embodiments, the first verification data may further be determined by: hash (hash(M1||M2|| . . . ||Mn)).

In some embodiments, the first verification data may be sent after the client and the server exchange public keys, and the first verification data includes the set of hashes values of all frames of message sent and/or received by the first client; or is carried in each message sent from the server to the client.

In some embodiments, the first verification data being carried in each message sent from the server to the client includes the following. The server determines the first verification data based on a first hash value carried in a most recently received message, and based on a second hash value of a message that will be sent from the server to the client. The first verification data may be a sum of the first hash value and the second hash value. For example, the first hash value in the first client greeting message is obtained based on the first client greeting message; the second hash value of the first server feedback message is determined by the server based on the first server feedback message. In the first feedback message, a set of hash values of the first client greeting message and the first server feedback message includes the sum of the first hash value and the second hash value. A length of the first hash value may be the same as a length of the second hash value.

In an operation S205, the client sends a second authentication message to the server.

In some embodiments, the client sends the second authentication message to the server, the second authentication message includes the certificate of the client. The second authentication message is configured to verify the identity of the client by the server.

In some embodiments, as shown in FIG. 5, the second authentication information is sent to the server via the Authenticate message.

In an operation S206, the client sends second verification data to the server.

In some embodiments, the client sends the second verification data to the server. The second verification data includes a set of hash values of all frames of the message sent and/or received by the server. For example, the second verification data=hash(M1||M2|| . . . ||Mn), each of the M1, M2, . . . , and Mn is one frame of the message sent and/or received by the server, and the M1, M2, . . . , and Mn forms all frames of the message. For example, in the present embodiment, the first verification data includes: the hash value of the first client greeting message, a hash value of the first server feedback message, a hash value of the first authentication message, a hash value of the second authentication message, and a hash value of the first verification data, in the condition that the client sends the first client greeting message to the server, the server sends the first server feedback message to the client, the server sends the first authentication message to the client, the server sends the first authentication message to the client, and the client sends the second authentication message to the server.

In some embodiments, as shown in FIG. 5, the second verification data is sent to the server via the Finished message.

In some embodiments, the second verification data may further be obtained by: hash (hash(M1||M2|| . . . ||Mn)).

In some embodiments, the second verification data may be sent after the client and the server exchange public keys, and the second verification data includes the set of hashes values of all frames of the message sent and/or received by the first client; or is carried in each message sent from the client to the server.

In some embodiments, the second verification data being carried in each message sent from the server to the client includes the following. The client determines the second verification data based on a third hash value carried in a most recently received message, and based on a fourth hash value of a message that will be sent from the client to the server. The second verification data may be a sum of the third hash value and the fourth hash value. For example, the third hash value in the first client greeting message is obtained based on the first server feedback message; the fourth hash value of the third client greeting message is determined by the client based on the third client greeting message. In the third client greeting message, the second verification data includes the sum of the third hash value and the fourth hash value. A length of the third hash value may be the same as a length of the fourth hash value.

In the data transmission method provided by the present disclosure, the client and/or the server that has poor performance or low security requirements may transmit data by using the ECDH-based network configuration protocol. The data transmission process does not need to be selected by the developer or selected in advance. The client or the server may determine the transmission process on their own according to actual requirements. Furthermore, in the present disclosure, each frame of the message transmitted by the client and/or the server is involved in computing the hash value of the verification data, such that the handshaking data may not be tampered, and security and reliability of the handshaking process may be improved.

Figure 6:
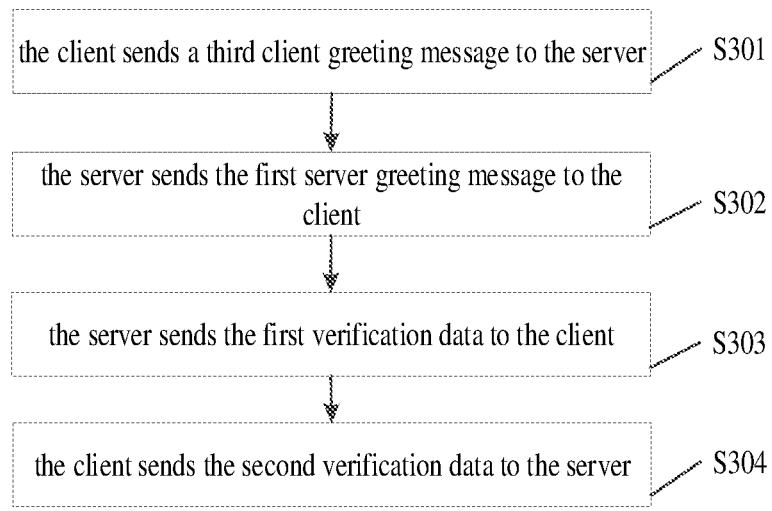
FIG. 6 is a flow chart of handshaking a shared key by taking the network configuration protocol of the ECJPAKE according to an embodiment of the present disclosure.
Figure 7:
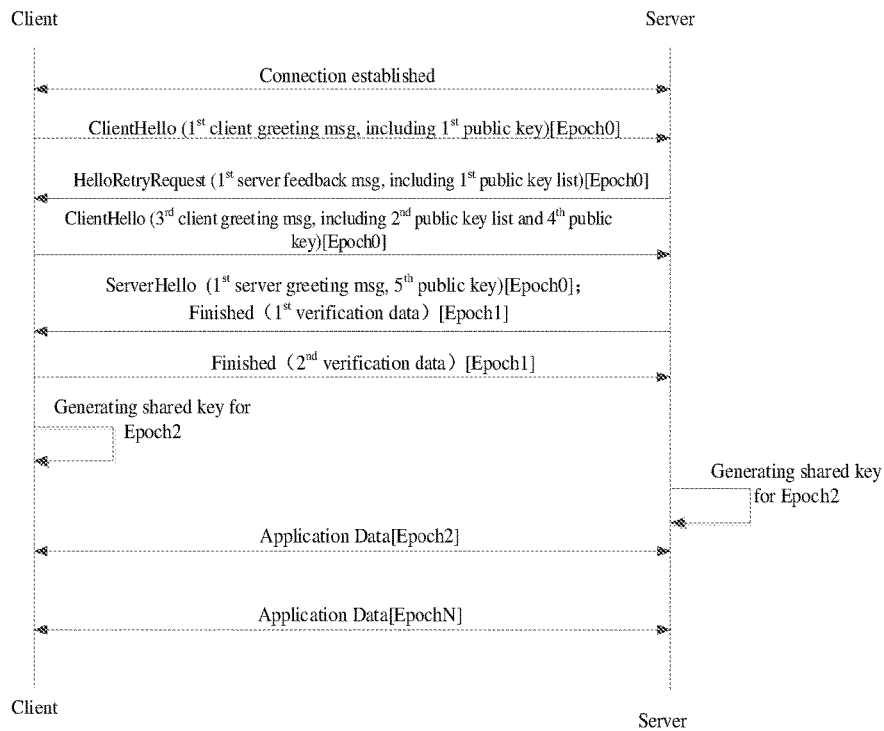
FIG. 7 is a flow chart of a detailed process of handshaking the shared key by taking the network configuration protocol of the ECJPAKE according to an embodiment of the present disclosure.

FIG. 6 is a flow chart of handshaking a shared key by taking the network configuration protocol of the ECJPAKE according to an embodiment of the present disclosure; and FIG. 7 is a flow chart of a detailed process of handshaking the shared key by taking the network configuration protocol of the ECJPAKE according to an embodiment of the present disclosure. Embodiments will be illustrated in the following by referring to FIG. 6 and FIG. 7.

The present embodiment corresponds to the scenario 2 in the operation S103, the second handshake-key mode is handshaking the shared key by using the ECJPAKE-based network configuration protocol.

In an operation S301, the client sends a third client greeting message to the server.

In some embodiments, the client sends the third client greeting message to the server based on the operation S102, in the condition that the client obtains the first feedback message from the server and determines the second key transmission mode as handshaking the shared key by using the ECJPAKE-based network configuration protocol based on the first feedback message.

In some embodiments, the third client greeting message includes at least one of: the first cipher suite, the first cipher curve, and the first protocol identifier.

In some embodiments, the third client greeting message may further include: a second public key list. The second public key list includes a public key pair for determining the shared key for the first server. The second public key list may further include a PIN code of the client.

In some embodiments, the third client greeting message may further include: a fourth public key. The fourth public key is determined based on the first cipher suite and/or the first cipher curve. The fourth public key may further include the PIN code of the client.

In some embodiments, the third client greeting message may further include: a second numeric sequence formed by combining the fourth public key with a second random sequence. The second random sequence is randomly generated by the client.

For example, the fourth public key may include: ####. The second random sequence may include **** (the second random sequence may be a random sequence consisting of a number, a capital letter, a lower case letter, and a symbol). The second numeric sequence may include ####****. The second random sequence may be known only to the server and is configured to increase complexity of transmitting the fourth public key, preventing the fourth public key from being obtained based on the second numeric sequence after the second numeric sequence being intercepted by a third party. The second random sequence is not involved in determining the first key. After the server receives the second numeric sequence, the second random sequence may be removed from the second numeric sequence, and the fourth public key may be obtained, such that the first key may be determined.

In some embodiments, as shown in FIG. 7, the third client greeting message is sent to the server via a ClientHello message.

Accordingly, the server receives the second public key list and the fourth public key and determines the first key based on the public key pair included in the second public key list and the fourth public key.

In an operation S302, the server sends the first server greeting message to the client.

In some embodiments, the first server greeting message includes at least one of: the first cipher suite, the first cipher profile, and the first protocol identifier.

In some embodiments, the first server greeting message may further include: a fifth public key. The fifth public key is determined based on the first cipher suite and/or the first cipher curve. A fifth public key list may further include a PIN code of the server.

In some embodiments, the first server greeting message may further include: a third numeric sequence formed by combining the fifth public key with a third random sequence. The third random sequence is randomly generated by the server.

In some embodiments, as shown in FIG. 7, the first server greeting message is sent to the client via a ServerHello message.

Accordingly, the client determines the first key based on the public key pair included in the first public key list and the fifth public key in the first server feedback message.

In an operation S303, the server sends the first verification data to the client.

In some embodiments, the server sends the first verification data to the client. The first verification data includes a set of hash values of all frames of the message sent and/or received by the client. For example, the first verification data=hash(M1||M2|| . . . ||Mn), each of the M1, M2, . . . , and Mn is one frame of the message sent and/or received by the client, and the M1, M2, . . . , and Mn forms all frames of the message. For example, in the present embodiment, the first verification data includes: a hash value of the first client greeting message, a hash value of the third client greeting message, a hash value of the first server feedback message, and a hash value of the first server greeting message, in the condition that the client sends the first client greeting message and the third client greeting message to the server, and the server sends the first server feedback message and the first server greeting message to the client. As shown in FIG. 7, the first verification data is sent to the client via the Finished message.

In some embodiments, the first verification data may alternatively be obtained by: hash (hash(M1||M2|| . . . ||Mn)).

In some embodiments, the first verification data may be sent after the client and the server exchange public keys with each other, and the first verification data includes a set of hash values of all frames of the message sent and/or received by the first client; or is carried in each message sent from the server to the client.

In some embodiments, the first verification data being carried in each message sent from the server to the client includes the following. The server determines the first verification data based on the first hash value carried in the most recently received message, and based on the second hash value of the message that will be sent from the server to the client. The first verification data may be a sum of the first hash value and the second hash value. For example, the first hash value in the first client greeting message is obtained based on the first client greeting message; the second hash value of the first server feedback message is determined by the server based on the first server feedback message. In the first feedback message, the first server feedback message includes the sum of the first hash value and the second hash value. A length of the first hash value may be the same as a length of the second hash value.

In an operation S304, the client sends the second verification data to the server.

In some embodiments, the client sends the second verification data to the server. The second verification data includes a set of hash values of all frames of the message sent and/or received by the server. For example, the second verification data=hash(M1||M2|| . . . ||Mn), each of the M1, M2, . . . , and Mn is one frame of the message sent and/or received by the server, and the M1, M2, . . . , and Mn forms all frames of the message. For example, in the present embodiment, the first verification data includes: the hash value of the first client greeting message, the hash value of the first server feedback message, the hash value of the first authentication message, the hash value of the second authentication message, and the hash value of the first verification data, in the condition that the client sends the first client greeting message to the server, the server sends the first server feedback message to the client, the server sends the first authentication message to the client, the server sends the first authentication message to the client, and the client sends the second authentication message to the server.

In some embodiments, as shown in FIG. 7, the second verification data is sent to the server via the Finished message.

In some embodiments, the second verification data may be obtained by: hash (hash(M1||M2|| . . . ||Mn)).

In some embodiments, the second verification data may be sent after the client and the server exchange public keys with each other, and the second verification data includes a set of hash values of all frames of the message sent and/or received by the first client; or is carried in each message sent from the client to the server.

In some embodiments, the second verification data being carried in each message sent from the server to the client includes the following. The client determines the second verification data based on the third hash value carried in the most recently received message, and based on the fourth hash value of the message that will be sent from the client to the server. The second verification data may be the sum of the third hash value and the fourth hash value. For example, the third hash value in the first client greeting message is obtained based on the first server feedback message; the fourth hash value of the third client greeting message is determined by the client based on the third client greeting message. In the third client greeting message, the second verification data includes the sum of the third hash value and the fourth hash value. A length of the first hash value may be the same as a length of the second hash value.

Accordingly, the present disclosure provides a flexible data transmission method. A terminal device, which has poor performance and low security requirements, may use the ECJPAKE-based network configuration protocol for data transmission. A data transmission process does not need to be selected by a developer or selected in advance. The terminal device or the server may determine the transmission process by itself based on actual needs. Furthermore, in the present disclosure, for the terminal device having requirements of a high security level, a PIN code of the terminal device is combined with the transmission process, difficulty of deciphering the PIN code may be increased, and security of data transmission may be improved. In addition, in the present disclosure, each frame of the message transmitted by the terminal device and/or the server is involved in computing the hash value of the verification data, such that handshaking data may not be tampered, and security and reliability of a handshaking process may be improved.

Figure 8:
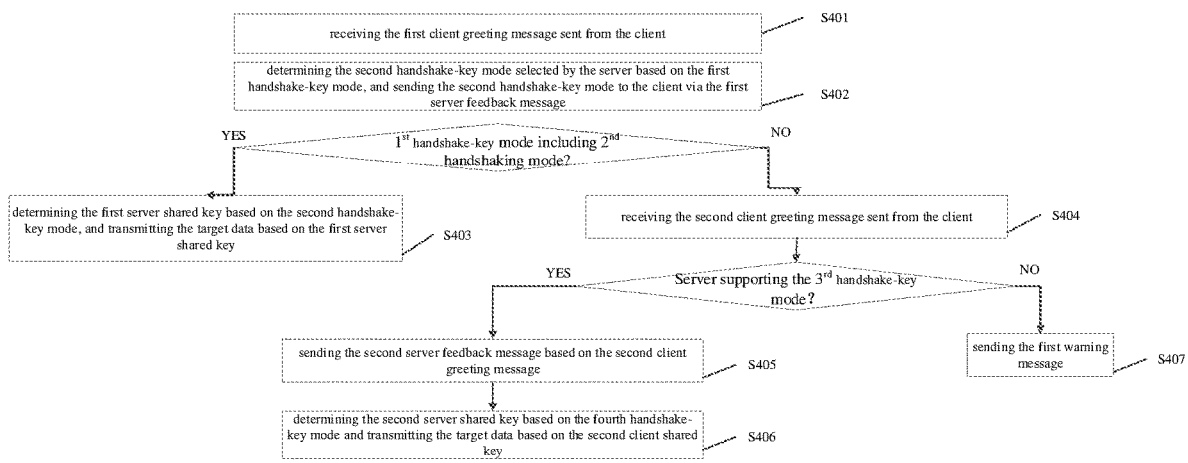
FIG. 8 is a flow chart of a data transmission method performed by a server according to an embodiment of the present disclosure.

FIG. 8 is a flow chart of a data transmission method performed by a server according to an embodiment of the present disclosure. Embodiments will be illustrated based on each operation.

In an operation S401, receiving the first client greeting message sent from the client.

In some embodiments, the server receives the first client greeting message from the client. The first client greeting message includes the first information, the first information is configured to indicate the first handshake-key mode that can be supported by the client.

In some embodiments, the first handshake-key mode includes handshaking the key by using the ECDH-based network configuration protocol and/or the ECJPAKE-based network configuration protocol.

In some embodiments, the first information includes the first set of cipher suites. The first set of cipher suites includes a set of at least one cipher suite that can be supported by the client.

In some embodiments, the first client greeting message may further include: a first cipher suite field. The cipher suite field is configured to indicate some or all of the cipher suite parameters supported by the client.

In some embodiments, the first information may further include the first set of cipher curves. The first set of cipher curves includes a set of at least one cipher curve that can be supported by the client.

In some embodiments, the first client greeting message may further include: the first cipher curve field. The cipher curve field is configured to indicate some or all of the cipher curve parameters supported by the client.

In some embodiments, the first client greeting message further includes: the first public key. The first public key includes: the public key determined by any cipher suite in the first set of cipher suites and/or any cipher curve in the first set of cipher curves, in the condition that the client can support the ECDH-based network configuration protocol. Different cipher suites and/or cipher curves may determine different public keys.

In some embodiments, the first client greeting message further includes: the first set of protocol identifiers. The first set of protocol identifiers includes the protocol identifier corresponding to at least one protocol version. The protocol version and the protocol identifier are in one-to-one correspondence. The first set of protocol identifiers indicates a set of protocol versions supported by the client.

In some embodiments, the first client greeting message may further include: the protocol version field. The protocol version field is configured to indicate some or all of protocol version parameters supported by the client.

In some embodiments, the first client greeting message further includes: a first public key list. The first public key list of the first client greeting message is NULL.

In an operation S402, determining the second handshake-key mode selected by the server based on the first handshake-key mode, and sending the second handshake-key mode to the client via the first server feedback message.

In some embodiments, the server determining the second handshake-key mode selected by the server based on the first handshake-key mode, includes the following. The server determines the second handshake-key mode supported by the server based on at least one cipher suite included in the first set of cipher suites carried in the first client greeting message, at least one cipher curve included in the first set of cipher curves carried in the first client greeting message, and the protocol identifier corresponding to the at least one protocol version included in the first set of protocol identifiers carried in the first client greeting message.

In some embodiments, the server determines the first cipher suite, the first cipher curve, and the first protocol identifier corresponding to the second handshake-key mode, and sends the first cipher suite, the first cipher curve, and the first protocol identifier to the client via the first server feedback message, in the condition that the first set of cipher suites included in the first client greeting message includes at least one cipher suite supported by the server, the first set of cipher curves included in the first client greeting message includes at least one cipher curve supported by the server, and the first set of protocol identifiers included in the first client greeting message includes the protocol identifier corresponding to at least one protocol version supported by the server. In the condition that the server determines the second handshake-key mode as handshaking the key by using the ECDH-based network configuration protocol, the first server feedback message further includes: the second public key. The second public key is determined based on at least one of the first cipher suite, the first cipher curve, and the first protocol identifier. Alternatively, in the condition that the server determines the second handshake-key mode as handshaking the key by using the ECJPAKE-based network configuration protocol, the first server feedback message further includes the first public key list. The first public key list includes the public key pair, which is sent from the server to the client and is configured to determine the first client shared key. The first public key list may further include the PIN code of the server.

In some embodiments, the server sends the first server feedback message to the client based on its own capability, in the condition that the first set of cipher suites that is not included in the first client greeting message includes at least one cipher suite supported by the server; or the first set of cipher curves included in the first client greeting message does not include the at least one cipher curve supported by the server; or the first set of protocol identifiers included in the first client greeting message does not include the protocol identifier corresponding to the at least one protocol version supported by the server. The first server feedback message includes: the second cipher suite, the second cipher curve, and the second protocol identifier. The first set of cipher suites does not include the second cipher suite. The second cipher suite includes any one of the at least one cipher suite supported by the server. The first set of cipher curves does not include the second cipher curve, the second cipher curve includes any one of the at least one cipher curve supported by the server. The first set of protocol identifiers includes the second protocol identifier, the second protocol identifier includes the protocol identifier corresponding to any one of the at least one protocol version supported by the server.

In an operation S403, determining the first server shared key based on the second handshake-key mode in response to the first handshake-key mode including the second handshake-key mode, and transmitting the target data based on the first server shared key.

In some embodiments, the first client shared key is determined based on the second handshake-key mode in the condition that the first handshake-key mode includes the second handshake-key mode, and the target data is transmitted based on the first client shared key.

In some embodiments, the first handshake-key mode including the second handshake-key mode, includes the following. The first handshake-key mode includes the second handshake-key mode that is corresponding to the first cipher suite carried in the first server feedback message, the first cipher curve carried in the first server feedback message, and the first protocol identifier carried in the first server feedback message, in the condition that the first set of cipher suites includes the first cipher suite; the first set of cipher curves includes the first cipher curve; and the first set of protocol identifiers includes the first protocol identifier.

In some embodiments, the first handshake-key mode including the second handshake-key mode, includes the following. The protocol version parameter of the protocol version field of the first client greeting message includes the protocol version parameter of the protocol version field of the first server feedback message. The cipher suite parameter of the cipher suite field of the first client greeting message includes the cipher suite parameter of the cipher suite field of the first server feedback message. The cipher curve parameter of the cipher curve field of the first client greeting message includes the cipher suite parameter of the cipher suite field of the first server feedback message.

In some embodiments, determining the first client shared key based on the second handshake-key mode includes the scenario 1 (the operations S201 to S206) and the scenario 2 (operations S301 to S304), which will not be repeated here.

In some embodiments, the scenario 1 includes the following. The second handshake-key mode is handshaking the key by using the ECDH-based network configuration protocol. Determining the first client shared key based on the second handshake-key mode includes: handshaking the key by using the ECDH-based network configuration protocol.

In some embodiments, the scenario 2 includes the second handshake-key mode being the ECJPAKE-based network configuration protocol.

In an operation S404, receiving the second client greeting message sent from the client, in response to the first handshake-key mode not including the second handshake-key mode.

In some embodiments, the first handshake-key mode not including the second handshake-key mode, includes the following. The first set of cipher suites included in the first client greeting message does not include the second cipher suite carried in the first server feedback message. Alternatively, the first set of cipher curves included in the first client greeting message does not include the second cipher curve carried in the first feedback message. Alternatively, the first set of protocol identifiers included in the first client greeting message does not include the second protocol identifier carried in the first feedback message. That is, the first handshake-key mode does not include the second handshake-key mode that is corresponding to the cipher suite carried in the first server feedback message, the cipher curve carried in the first server feedback message, and the protocol identifier carried in the first server feedback message.

In some embodiments, the server receiving the second client greeting message sent from the client, and the client sending the second client greeting message, includes the following. The client sends the second client greeting message to the server. The second client greeting message includes a second information, the second information is configured to indicate the third handshake-key mode that can be supported by the client.

In some embodiments, the second information includes a second set of cipher suites that can be supported by the client and/or a second set of cipher curves that can be supported by the client. At least one cipher suite included in the first set of cipher suites is completely different from at least one cipher suite included in the second set of cipher suites. At least one cipher curve included in the first set of cipher curves is completely different from at least one cipher curve included in the second set of cipher curves.

In some embodiments, the second client greeting message further includes: the fourth public key. The fourth public key includes: a public key determined by any one of the second set of cipher suites and/or any one of the second set of cipher curves, in the condition that the client can support the ECDH-based network configuration protocol.

In some embodiments, the second client greeting message further includes a second set of protocol identifiers. The second set of protocol identifiers includes the protocol identifier corresponding to at least one protocol version. The protocol version and the protocol identifier are in one-to-one correspondence. The second set of protocol identifiers indicates a set of protocol versions supported by the client.

In some embodiments, the second client greeting message further includes: the second public key list. The second public key list of the second client greeting message is NULL.

In some embodiments, an operation S405 is performed in the condition that the server can support the third handshake-key mode. An operation S407 is performed in the condition that the server cannot support the third handshake-key mode.

In the operation S405, sending the second server feedback message based on the second client greeting message. The second server feedback message is configured to indicate the fourth handshake-key mode determined by the server.

In some embodiments, the second server feedback message is configured to indicate the fourth handshake-key mode determined by the server.

In some embodiments, the detailed process of the server sending the second server feedback message based on the second client greeting message is similar to the operation S402 and will not be repeated here.

In the operation S406, determining the second server shared key based on the fourth handshake-key mode and transmitting the target data based on the second client shared key.

In some embodiments, the detailed process of determining the second client shared key based on the server fourth handshake-key mode and transmitting the target data based on the second client shared key is similar to the operation S203 and will not be repeated here.

In the operation S407, sending the first warning message.

In some embodiments, the server being unable to support the third handshake-key mode includes the following. The second set of cipher suites included in the second client greeting message does not include the cipher suite supported by the server. Alternatively, the first set of cipher curves included in the second client greeting message does not include the cipher curve supported by the server. Alternatively, the first set of protocol identifiers included in the second client greeting message does not include the protocol identifier supported by the server.

In some embodiments, the server sends the first warning message to the client, the first warning message is configured to indicate the client being disconnected with the server.

Accordingly, the present disclosure provides a flexible data transmission method. A client, which has better performance and high security requirements, may use the ECJPAKE-based network configuration protocol for data transmission. A data transmission process does not need to be selected by a developer or selected in advance. The client or the server may determine the transmission process by itself based on actual needs. Furthermore, in the present disclosure, for the client having requirements of a high security level, a PIN code of the client is combined with the transmission process, difficulty of deciphering the PIN code may be increased, and security of data transmission may be improved. In addition, in the present disclosure, each frame of the message transmitted by the terminal device and/or the server is involved in computing the hash value of the verification data, such that handshaking data may not be tampered, and security and reliability of a handshaking process may be improved.

Figure 9:
FIG. 9 is a flow chart of a data transmission method according to an embodiment of the present disclosure.
Figure 10:
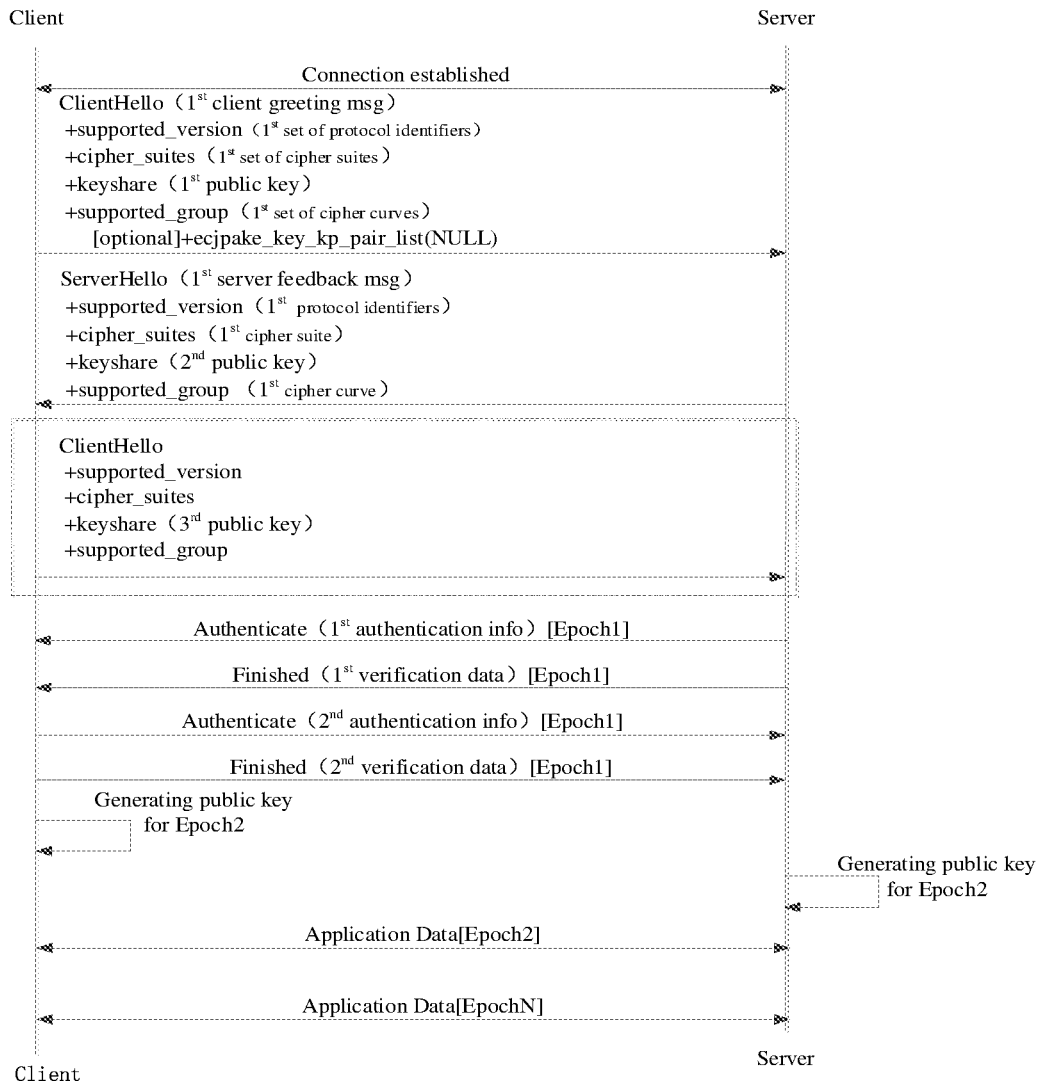
FIG. 10 is a flow chart of a detailed process of the data transmission method according to an embodiment of the present disclosure.

FIG. 9 is a flow chart of a data transmission method according to an embodiment of the present disclosure; and FIG. 10 is a flow chart of a detailed process of the data transmission method according to an embodiment of the present disclosure. Embodiments will be illustrated in the following by referring to FIG. 9 and FIG. 10.

In an operation S501, the client sends the first client greeting message to the server.

In some embodiments, the client sends the first client greeting message to the server, the first client greeting message includes the first information, the first information is configured to indicate the first handshake-key mode that can be supported by the client.

In some embodiments, the first handshake-key mode includes handshaking the key by using the ECDH-based network configuration protocol and/or the ECJPAKE-based network configuration protocol.

In some embodiments, the first information includes at least one of the first set of cipher suites, the first set of cipher curves, and the first set of protocol identifiers. The first set of cipher suites includes a set of at least one cipher suite that can be supported by the client. The first set of cipher curves includes a set of at least one cipher curve that can be supported by the client. The first set of protocol identifiers includes the protocol identifier corresponding to at least one protocol version. The protocol version and the protocol identifier are in one-to-one correspondence. The first set of protocol identifiers indicates a set of protocol versions supported by the client.

In some embodiments, the first client greeting message is transmitted via the ClientHello message illustrated in FIG. 10. A "supported_version" field included in the ClientHello message is configured to indicate the first set of protocol identifiers. A "cipher_suites" included in the ClientHello message is configured to indicate the first set of cipher suites. A "supported_group" field included in the ClientHello message is configured to indicate the first set of cipher curves. A "keyshare" field included in the ClientHello message is configured to indicate the first public key.

In some embodiments, the ClientHello message further includes "ecjpake_key_kp_pair_list" to indicate the public key pair used by the ECJPAKE-based network configuration protocol. In the present embodiment, the "ecjpake_key_kp_pair_list" is NULL.

In some embodiments, the "keyshare" field is further configured to indicate a fourth random sequence. The fourth random sequence includes a randomly generated sequence by the client. Further, the "keyshare" field is configured to indicate a fourth numeric sequence formed by combining the first public key combined with the fourth random sequence.

In an operation S502, the server sends the first server feedback message to the client.

In some embodiments, the server receives the first client greeting message sent from the client. Determining the second handshake-key mode selected by the server based on the first handshake-key mode includes the following. The server determines the second key mode supported by the server based on at least one cipher suite included in the first set of cipher suites carried in the first client greeting message, at least one cipher curve included in the first set of cipher curves carried in the first client greeting message, and the protocol identifier corresponding to the at least one protocol version that is included in the first set of protocol identifiers and is carried in the first client greeting message.

In some embodiments, the server determines the first cipher suite corresponding to the second handshake-key mode, the first cipher curve corresponding to the second handshake-key mode, and the first protocol identifier corresponding to the second handshake-key mode, and sends the first cipher suite, the first cipher curve, and the first protocol identifier to the client via the first server feedback message, in the condition that the first set of cipher suites included in the first client greeting message includes at least one cipher suite supported by the server; the first set of cipher curves included in the first client greeting message includes at least one cipher curve supported by the server; the first set of protocol identifiers included in the first client greeting message includes the protocol identifier corresponding to the at least one protocol version supported by the server.

In some embodiments, the first server feedback message further includes: the second public key, in the condition that the server determines the second handshake-key mode as handshaking the key by using the ECDH-based network configuration protocol, and the second public key is determined based on at least one of the first cipher suite, the first cipher curve, and the first protocol identifier.

In some embodiments, the first server feedback message is transmitted via the ServerHello message illustrated in FIG. 10. A "supported_version" field included in the ServerHello message is configured to indicate the first protocol identifier. A "cipher_suites" included in the ServerHello message is configured to indicate the first cipher suite. A "supported_group" field included in the ServerHello message is configured to indicate the first cipher curve. A "keyshare" field included in the ServerHello message is configured to indicate the second public key.

Since the present embodiment describes a process of handshaking the key by using the ECDH-based network configuration protocol, the ServerHello message does not include "ecjpake_key_kp_pair_list".

In some embodiments, the "keyshare" field is further configured to indicate the second random sequence, the second random sequence includes a randomly generated sequence by the server. Further, the "keyshare" field is configured to indicate the fourth numeric sequence formed by combining the second public key with the second random sequence.

In an operation S503, the client receives the first server feedback message.

In some embodiments, the client receives the first server feedback message, determines whether the first cipher curve included in the first feedback message is the same as the cipher curve for determining the first public key included in the first client greeting message. An operation S504 is performed, in the condition that the first cipher curve is different from the cipher curve for determining the first public key. Alternatively, an operation S505 is performed, in the condition that the first cipher curve is the same as the cipher curve for determining the first public key.

In an operation S504, the client sends the second client greeting message to the server.

In some embodiments, the second client greeting message includes at least one of: the first cipher suite, the first cipher curve, and the first protocol identifier.

In some embodiments, the second client greeting message may further includes: the third public key. The third public key is determined based on the first cipher suite and/or the first cipher curve.

In some embodiments, the second client greeting message may further includes: the first numeric sequence formed by combining the third public key with the first random sequence. The first random sequence is randomly generated by the client.

In some embodiments, the second client greeting message is transmitted via the ClientHello message illustrated in FIG. 10.

The "supported_version" field included in the ClientHello message is configured to indicate the first protocol identifier. The "cipher_suites" included in the ClientHello message is configured to indicate the first cipher suite. The "supported_group" field included in the ClientHello message is configured to indicate the first cipher curve. The "keyshare" field included in the ClientHello message is configured to indicate the third public key.

In some embodiments, the ClientHello message further includes "ecjpake_key_kp_pair_list" to indicate the public key pair used by the ECJPAKE-based network configuration protocol. In the present embodiment, the "ecjpake_key_kp_pair_list" is NULL.

In an operation S505, the server determines the first key based on the first public key or the third public key.

In some embodiments, the server determining the first key based on the first public key includes the following. The server determines the first key based on the first client greeting message, in the condition that the first cipher curve included in the first feedback message is the same as the cipher curve for determining the first public key included in the first client greeting message.

In some embodiments, the server determines the first key based on the first public key indicated by the "key share" field included in the first client greeting message. Alternatively, the server removes the fourth random sequence from the fourth numeric sequence indicated by the "keyshare" field and determines the first key based on the first public key included in the fourth numeric sequence.

In some embodiments, the server determining the first key based on the first public key includes the following. The server determines the first key based on the second client greeting message, in the condition that the first cipher curve included in the first feedback message is different from the cipher curve for determining the first public key included in the first client greeting message.

In some embodiments, the server determines the first key based on the third public key indicated by the "key share" field included in the second client greeting message. Alternatively, the server removes the first random sequence from first random sequence indicated by the "keyshare" field and determines the first key based on the third public key included in the first numeric sequence.

In some embodiments, the operations of S501 to S505 may be processes performed in an Epoch0 stage. The messages transmitted between the client and the server are not ciphered.

In an operation S506, the server sends the first authentication message to the client.

Detailed processes of the operation S506 are the same as those of the operation S203 and will not be repeated here.

In an operation S507, the server sends the first verification data to the client.

Detailed processes of the operation S507 are the same as those of the operation S204 and will not be repeated here.

In an operation S508, the client sends the second authentication message to the server.

Detailed processes of the operation S508 are the same as those of the operation S205 and will not be repeated here.

In an operation S509, the client sends the second checksum data to the server.

Detailed processes of the operation S509 are the same as those of the operation S206 and will not be repeated here.

The client sends the second authentication message to the server.

In some embodiments, the operations S506 to S509 may be performed in an Epoch1 stage. The messages transmitted between the client and the server are ciphered and/or deciphered by the first key.

In an operation S510, the client determines the first client shared key and transmits the target data based on the first client shared key.

In some embodiments, the client determining the first client shared key includes the following. The client determines the first client shared key based on at least one of the first public key, the second public key, the third public key, and the first key.

In some embodiments, the first verification data passing verification may indicate that the message sent and/or received by the client is not tampered, and the client may transmit the target data based on the first client shared key.

In an operation S511, the server determines the first server shared key and transmits the target data based on the first server shared key.

In some embodiments, the server determining the first server shared key includes the following. The server determines the first server shared key based on at least one of the first public key, the second public key, the third public key, and the first key.

In some embodiments, the second verification data passing verification may indicate that the message sent and/or received by the server is not tampered, and the server side may transmit the target data based on the first server shared key.

In some embodiments, the first client shared key is the same as or different from the first server shared key.

In some embodiments, the first client shared key is determined based on the first key, for example the first client shared key may include data determined after being ciphered by the first key.

In some embodiments, the operations S510 to S511 may be performed in an Epoch2 stage. The message transmitted by the client is ciphered and/or deciphered by the first client shared key. The message transmitted by the server is ciphered and/or deciphered by the first server shared key.

In some embodiments, the method further includes the following. The client and the server redetermines the client shared key, in response to the number of times that the client sends and/or receives the target data ciphered by the first client shared key being greater than a first threshold.

In some embodiments, the number of times that the client sends and/or receives the target data ciphered by the first client shared key being greater than the first threshold may include the following. When the first client shared key is taken to cipher data for too many times, an increased number of transmissions may increase a risk of the first client shared key being deciphered. In the condition that the number of times that the client sends and/or receives the target data ciphered by the first client shared key is greater than the first threshold, the client and the server update the first key and/or the first client shared key.

Accordingly, the present disclosure provides a flexible data transmission method. A data transmission process does not need to be selected by a developer or selected in advance. The client or the server may determine the transmission process by itself based on actual needs. Furthermore, in the present disclosure, each frame of the message transmitted by the terminal device and/or the server is involved in computing the hash value of the verification data, such that handshaking data may not be tampered, and security and reliability of a handshaking process may be improved.

Figure 11:
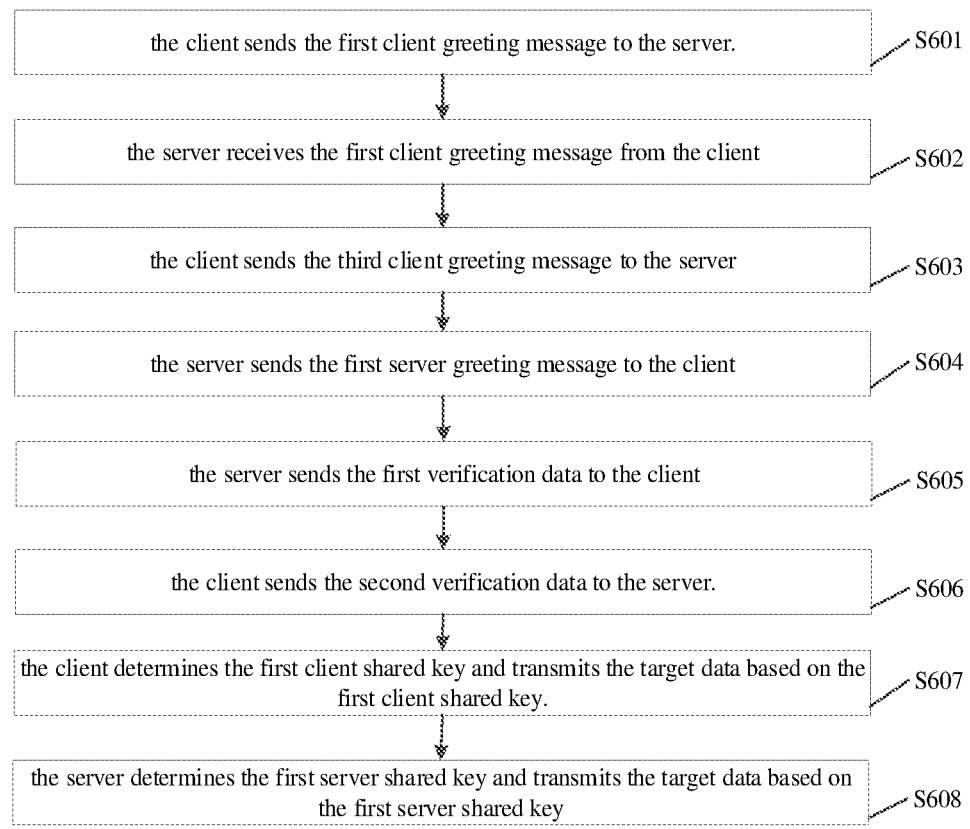
FIG. 11 is another flow chart of a data transmission method according to an embodiment of the present disclosure.
Figure 12:
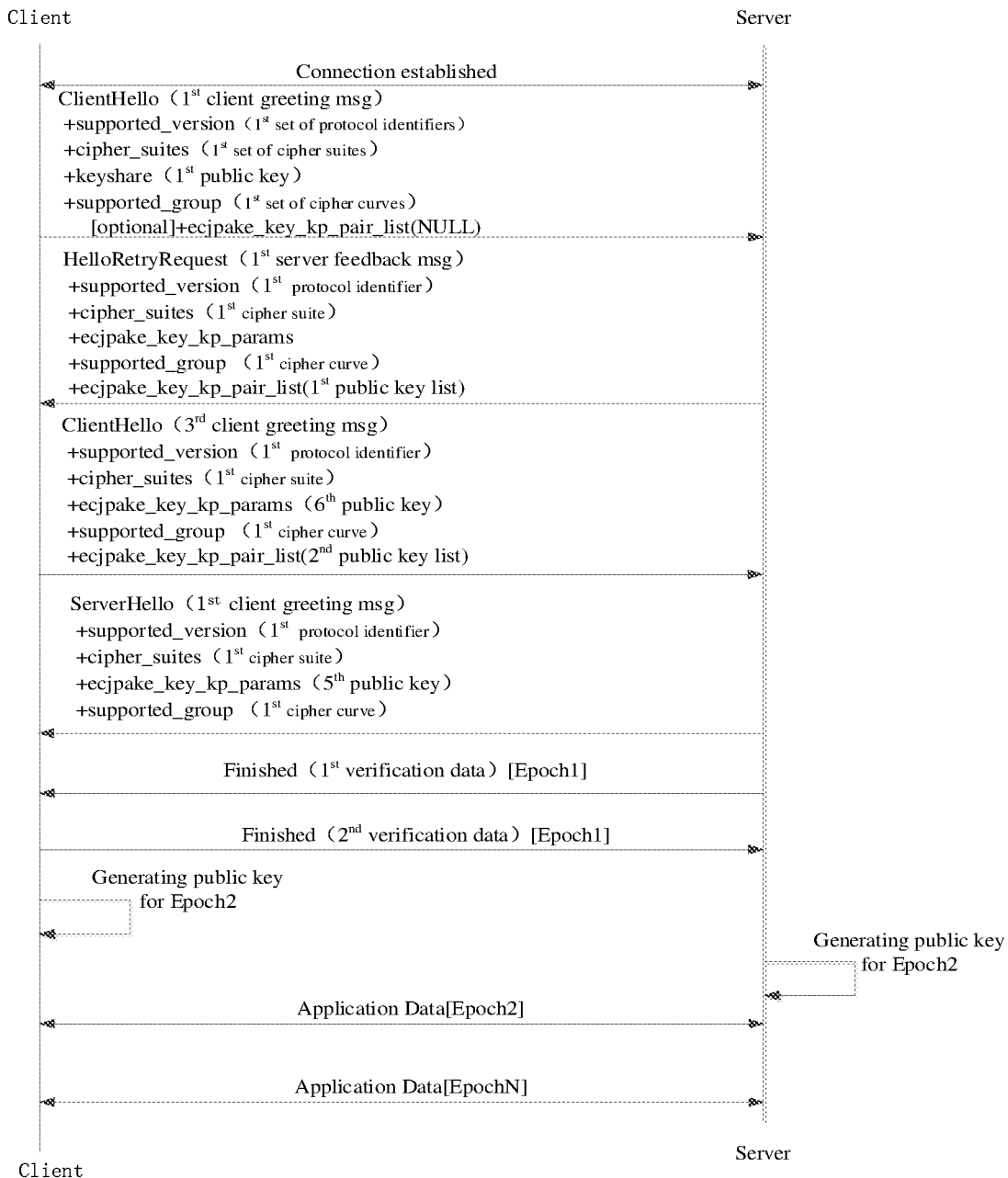
FIG. 12 is a flow chart of another detailed process of the data transmission method according to an embodiment of the present disclosure.

FIG. 11 is another flow chart of a data transmission method according to an embodiment of the present disclosure; and FIG. 12 is a flow chart of another detailed process of the data transmission method according to an embodiment of the present disclosure. Embodiments will be illustrated in the following by referring to FIG. 11 and FIG. 12.

In an operation S601, the client sends the first client greeting message to the server.

Detailed processes of the operation S601 is the same as the operation S501 and will not be repeated here.

In an operation S602, the server receives the first client greeting message from the client.

In some embodiments, the server receives the first client greeting message sent from the client; determines the second handshake-key mode selected by the server based on the first handshake-key mode; and sends the second handshake-key mode to the client via the first server feedback message.

In some embodiments, the server determining the second handshake-key mode selected by the server based on the first handshake-key mode includes the following. The server determines the second key mode supported by the server based on at least one cipher suite included in the first set of cipher suites carried in the first client greeting message, at least one cipher curve included in the first set of cipher curves carried in the first client greeting message, and the protocol identifier corresponding to at least one protocol version that is included in the first set of protocol identifiers and is carried in the first client greeting message.

In some embodiments, the server determines the first cipher suite corresponding to the second handshake-key mode, the first cipher curve corresponding to the second handshake-key mode, and the first protocol identifier corresponding to the second handshake-key mode, and sends the first cipher suite, the first cipher curve, and the first protocol identifier to the client via the first server feedback message, in the condition that the first set of cipher suites included in the first client greeting message includes at least one cipher suite supported by the server; the first set of cipher curves included in the first client greeting message includes at least one cipher curve supported by the server; the first set of protocol identifiers included in the first client greeting message includes the protocol identifier corresponding to at least one protocol version supported by the server.

In some embodiments, the first server feedback message further includes: the first public key list, in the condition that the server side determines the second handshake-key mode as handshaking the key by using the ECJPAKE-based network configuration protocol. The first public key is determined based on at least one of the first cipher suite, the first cipher curve, and the first protocol identifier. The first public key list may further include the PIN code of the server.

In some embodiments, the first server feedback message is transmitted via the HelloRetryRequest message illustrated in FIG. 12. A "supported_version" field included in the HelloRetryRequest message is configured to indicate the first protocol identifier. A "cipher_suites" field included in the HelloRetryRequest message is configured to indicate the first cipher suite. A "supported_group" field included in the HelloRetryRequest message is configured to indicate the first cipher curve.

In some embodiments, a "ecjpake_key_kp_params" field included in the HelloRetryRequest message is configured to indicate the second public key. Alternatively, a "key_share"

field included in the HelloRetryRequest message is configured to indicate the second public key.

Since the present embodiment describes the process of handshaking keys by using the ECJPAKE-based network configuration protocol, the HelloRetryRequest message includes "ecjpake_key_kp_pair_list", and the "ecjpake_key_kp_pair_list" is configured to indicate the first public key list.

In an operation S603, the client sends the third client greeting message to the server.

In some embodiments, the third client greeting message includes at least one of: the first cipher suite, the first cipher curve, and the first protocol identifier.

In some embodiments, the third client greeting message may further include: a second public key list and a sixth public key. The sixth public key is determined based on the first cipher suite and/or first cipher curve. The second public key list may further include the PIN code of the client.

In some embodiments, the third client greeting message may further include the first numeric sequence formed by combining the sixth public key with the first random sequence. The first random sequence is randomly generated by the client. The sixth public key may further include the PIN code of the client.

In some embodiments, the third client greeting message is transmitted via the ClientHello message illustrated in FIG. 12. A "supported_version" field included in the ClientHello message is configured to indicate the first protocol identifier. A "cipher_suites" field included in the ClientHello message is configured to indicate the first cipher suite. A "supported_group" field included in the ClientHello message is configured to indicate the first cipher curve.

In some embodiments, a "ecjpake_key_kp_params" field included in the ClientHello message is configured to indicate the sixth public key. Alternatively, a "key_share" field included in the ClientHello message is configured to indicate the sixth public key.

In some embodiments, the ClientHello message further includes "ecjpake_key_kp_pair_list" to indicate the second public key list used by the ECJPAKE-based network configuration protocol.

In an operation S604, the server sends the first server greeting message to the client.

In some embodiments, the first server greeting message includes at least one of: the first cipher suite, the first cipher curve, and the first protocol identifier.

In some embodiments, the first server greeting message may further include: the fifth public key. The fifth public key is determined based on the first cipher suite and/or the first cipher curve. The fifth public key may further include the PIN code of the server.

In some embodiments, the first server greeting message may further include: a third numeric sequence formed by combining the fifth public key with a third random sequence. The third random sequence is randomly generated by the server.

In some embodiments, the first server greeting message is transmitted via the ServerHello message illustrated in FIG. 12. A "supported_version" field included in the ServerHello message is configured to indicate the first protocol identifier. A "cipher_suites" field included in the ServerHello message is configured to indicate the first cipher suite. A "supported_group" field included in the ServerHello message is configured to indicate the first cipher curve.

In some embodiments, the ServerHello message further includes a "ecjpake_key_kp_pair_list" field to indicate the fifth public key. Alternatively, the "key_share" field included in the ServerHello message is configured to indicate the fifth public key.

In some embodiments, the operations S601 to S604 may be performed in the Epoch0 stage, and the messages transmitted between the client and the server are not ciphered.

In an operation S605, the server sends the first verification data to the client.

Detailed processes of the operation S605 is the same as the operation S303 and will not be repeated here.

In an operation S606, the client sends the second verification data to the server.

Detailed processes of the operation S606 is the same as the operation S303 and will not be repeated here.

In some embodiments, the operations S605 to S606 may be performed in the Epoch1 stage, and the messages transmitted between the client and the server are ciphered and/or deciphered by the first key.

In an operation S607, the client determines the first client shared key and transmits the target data based on the first client shared key.

In some embodiments, the client determining the first client shared key includes the following. The client determines the first client shared key based on at least one of the fifth public key, the sixth public key, the first public key list, the second public key list, and the first key.

In some embodiments, the first verification data passing verification may indicate that the message sent and/or received by the client is not tampered, and the client may transmit the target data based on the first client shared key.

In an operation S608, the server determines the first server shared key and transmits the target data based on the first server shared key.

In some embodiments, the server determining the first server shared key includes the following. The server determines the first server shared key based on at least one of the fifth public key, the sixth public key, the first public key list, the second public key list, and the first key.

In some embodiments, the second verification data passing the verification may indicate that the message sent and/or received by the server is not tampered, and the server transmits the target data based on the first server shared key.

In some embodiments, the first client shared key is the same as or different from the first server shared key.

In some embodiments, the first client shared key is determined based on the first key, for example the first client shared key may include data determined after being ciphered by the first key.

In some embodiments, the operations S510 to S511 may be performed in the Epoch2 stage, the messages and/or the data transmitted by the client is ciphered and deciphered by the first client shared key. The message and/or the data transmitted by the server is ciphered and deciphered by the first server shared key.

In some embodiments, the method further includes the following. The client and the server redetermines the client shared key, in response to the number of times that the client sends and/or receives the target data ciphered by the first client shared key being greater than the first threshold.

In some embodiments, the number of times that the client sends and/or receives the target data ciphered by the first client shared key being greater than the first threshold may include the following. When the first client shared key is taken to cipher data for too many times, an increased number of transmissions may increase a risk of the first client shared key being deciphered. In the condition that the number of times that the client sends and/or receives the target data ciphered by the first client shared key is greater than the first threshold, the client and the server update the first key and/or the first client shared key.

Accordingly, the present disclosure provides a flexible data transmission method. A client having better performance and high security requirements may take the ECJPAKE-based network configuration protocol for transmitting data. A data transmission process does not need to be selected by a developer or selected in advance. The client or the server may determine the transmission process by itself based on actual needs. Furthermore, in the present disclosure, for a client having requirements of a high security level, the PIN code of the client is combined with the transmission process to enhance the difficulty of deciphering PIN code, and security of data transmission may be improved. Furthermore, in the present disclosure, each frame of the message transmitted by the client and/or the server is involved in computing the hash value of the verification data, such that handshaking data may not be tampered, and security and reliability of a handshaking process may be improved.

Figure 13:
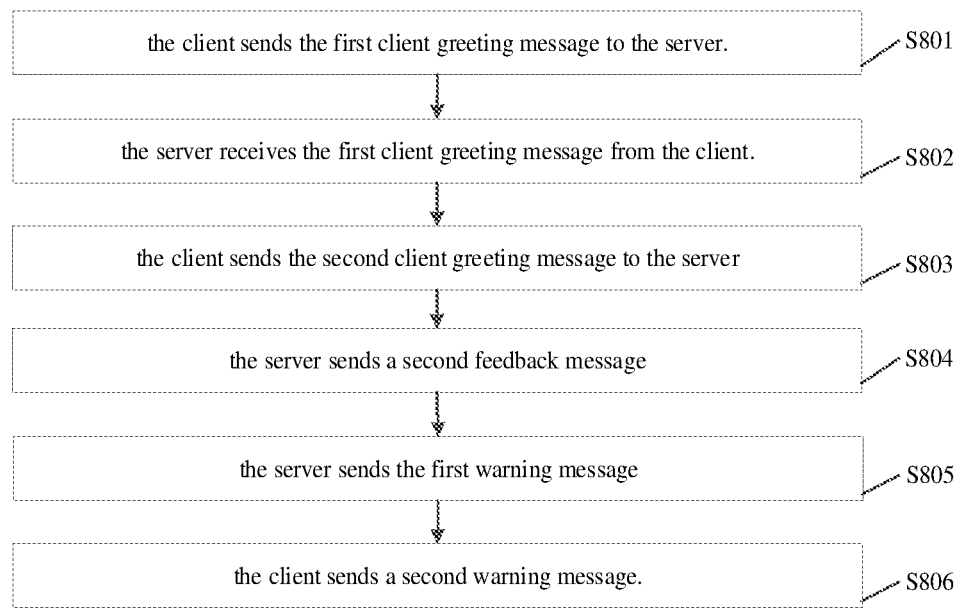
FIG. 13 is a flow chart of another data transmission method according to an embodiment of the present disclosure.
Figures 14, 15:
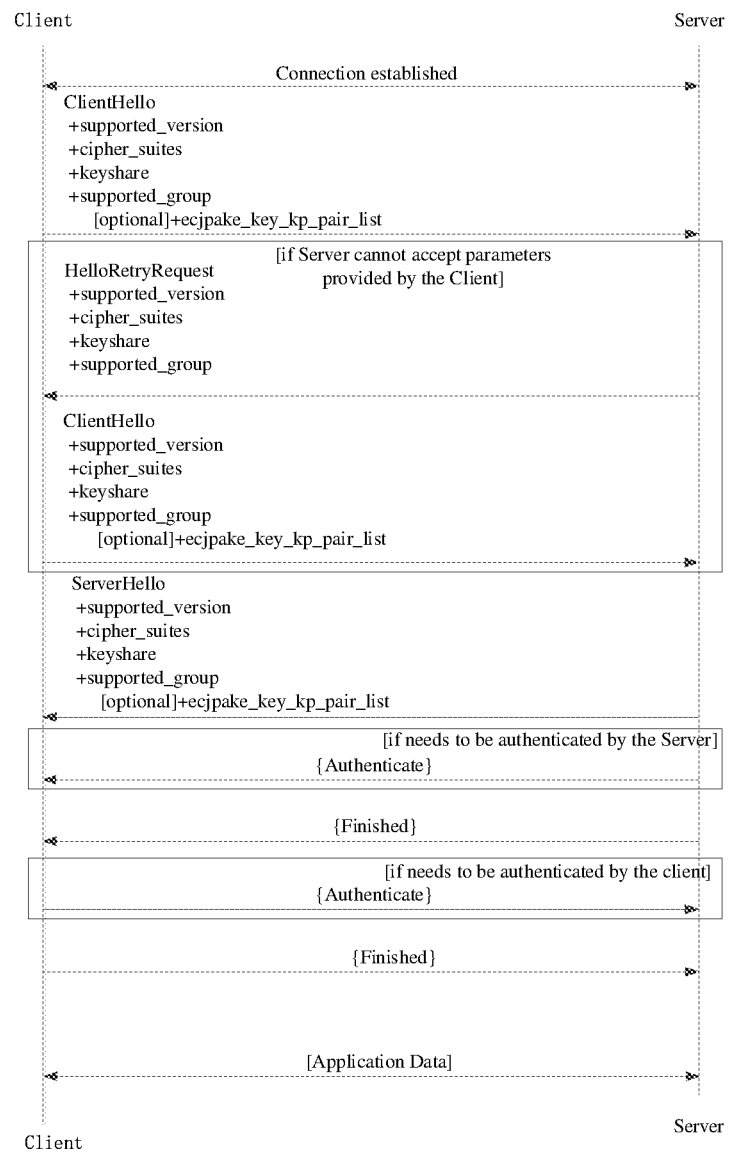
FIG. 14 is a flow chart of still another detailed process of the data transmission method according to an embodiment of the present disclosure.
FIG. 15 is a flow chart of still another data transmission method according to an embodiment of the present disclosure.

FIG. 13 is a flow chart of another data transmission method according to an embodiment of the present disclosure; and FIG. 14 is a flow chart of still another detailed process of the data transmission method according to an embodiment of the present disclosure. Embodiments will be illustrated in the following by referring to FIG. 11 and FIG. 12.

In an operation S801, the client sends the first client greeting message to the server.

Detailed processes of the operation S801 is the same as the operation S501 and will not be repeated here.

In an operation S802, the server receives the first client greeting message from the client.

In some embodiments, the server sends the first server feedback message to the client based on its own capability, in the condition that the first set of cipher suites that is not included in the first client greeting message includes at least one cipher suite supported by the server; or the first set of cipher curves included in the first client greeting message does not include the at least one cipher curve supported by the server; or the first set of protocol identifiers included in the first client greeting message does not include the protocol identifier corresponding to the at least one protocol version supported by the server. The first server feedback message includes: the second cipher suite, the second cipher curve, and the second protocol identifier. The first set of cipher suites does not include the second cipher suite. The second cipher suite includes any one of the at least one cipher suite supported by the server. The first set of cipher curves does not include the second cipher curve, the second cipher curve includes any one of the at least one cipher curve supported by the server. The first set of protocol identifiers includes the second protocol identifier, the second protocol identifier includes the protocol identifier corresponding to any one of the at least one protocol version supported by the server.

In some embodiments, the first server feedback message is transmitted via the HelloRetryRequest message illustrated in FIG. 14. The "supported_version" field included in the HelloRetryRequest message is configured to indicate the second protocol identifier. The "cipher_suites" field included in the HelloRetryRequest message is configured to indicate the second cipher suite. The "supported_group" field included in the HelloRetryRequest message is configured to indicate the second cipher curve.

In some embodiments, the "ecjpake_key_kp_params" field included in the HelloRetryRequest message is configured to indicate the second public key. Alternatively, the "key_share" field included in the HelloRetryRequest message is configured to indicate the second public key.

In some embodiments, the operations S503 to S511 or the operations of S603 to S608 are performed, in the condition that the first handshake-key mode includes the second handshake-key mode corresponding to the second cipher suite, the second cipher curve, and the second protocol identifier. An operation S803 is performed, in the condition that the first handshake-key mode does not include the second handshake-key mode corresponding to the second cipher suite, the second cipher curve, and the second protocol identifier.

In the operation S803, the client sends the second client greeting message to the server.

In some embodiments, the client sending the second client greeting message includes the following. The client sends the second client greeting message to the server, the second client greeting message includes a second information, the second information is configured to indicate a third handshake-key mode that can be supported by the client.

In some embodiments, the second information includes a second set of cipher suites that can be supported by the client and/or a second set of cipher curves that can be supported by the client. At least one cipher suite included in the first set of cipher suites is completely different from at least one cipher suite included in the second set of cipher suites. At least one cipher curve included in the first set of cipher curves is completely different from at least one cipher curve included in the second set of cipher curves.

In some embodiments, the second client greeting message further includes: a fourth public key. The fourth public key includes: a public key determined by any cipher suite in the second set of cipher suites and/or any cipher curve in the second set of cipher curves, in the condition that the client supports the ECDH-based network configuration protocol.

In some embodiments, the second client greeting message further includes: a second set of protocol identifiers. The second set of protocol identifiers includes a protocol identifier corresponding to at least one protocol version. The protocol version and the protocol identifier are in one-to-one correspondence. The second set of protocol identifiers indicates a set of protocol versions supported by the client.

In some embodiments, the second client greeting message further includes: a second public key list. The second public key list of the second client greeting message is NULL.

In some embodiments, the second client greeting message is transmitted via the ClientHello message illustrated in FIG. 14. A "supported_version" field included in the ClientHello message is configured to indicate the second set of protocol identifiers. A "cipher_suites" field included in the ClientHello message is configured to indicate the second set of cipher suites. A "supported_group" field included in the ClientHello message is configured to indicate the second set of cipher curves.

In some embodiments, a "ecjpake_key_kp_params" field included in the ClientHello message is configured to indicate the fourth public key. Alternatively, a "key_share" field included in the ClientHello message is configured to indicate the fourth public key.

In some embodiments, the ClientHello message further includes an "ecjpake_key_kp_pair_list" to indicate the public key pair used by the ECJPAKE-based network configuration protocol. In the present example, the "ecjpake_key_kp_pair_list" is NULL.

In some embodiments, an operation S804 is performed, in the condition that the third handshake-key mode includes a fourth handshake-key mode corresponding to a cipher suite that can be supported by the server, a cipher curve that can be supported by the server, and a protocol identifier that can be supported by the server. An operation S805 is performed, in the condition that the third handshake-key mode does not include the fourth handshake-key mode corresponding to the cipher suite that can be supported by the server, the cipher curve that can be supported by the server, and the protocol identifier that can be supported by the server.

In the operation S804, the server sends a second feedback message.

In some embodiments, the server determines the second cipher suite, the second cipher curve, and the second protocol identifier corresponding to the fourth handshake-key mode, and sends the second cipher suite, the second cipher curve, and the second protocol identifier to the client via the second server feedback message, in the condition that the second set of cipher suites included in the second client greeting message includes at least one cipher suite supported by the server, the second set of cipher curves included in the second client greeting message includes at least one cipher curve supported by the server, and the second set of protocol identifiers included in the second client greeting message includes the protocol identifier corresponding to at least one protocol version supported by the server. In the condition that the server determines the fourth handshake-key mode as handshaking the key by using the ECDH-based network configuration protocol, the first server feedback message further includes: a fourth public key. The fourth public key is determined based on at least one of the second cipher suite, the second cipher curve, and the second protocol identifier. Alternatively, in the condition that the server determines the second handshake-key mode as handshaking the key by using the ECJPAKE-based network configuration protocol, the first server feedback message further includes a third public key list. The third public key list includes a public key pair, which is sent from the server to the client and is configured to determine the first client shared key.

In some embodiments, the first server greeting message is transmitted via the ServerHello message illustrated in FIG. 14. A "supported_version" field included in the ServerHello message is configured to indicate the second protocol identifier. A "cipher_suites" field included in the ServerHello message is configured to indicate the second cipher suite. A "supported_group" field included in the ServerHello message is configured to indicate the second cipher curve. The "keyshare" field included in the ServerHello message is configured to indicate the fourth public key.

In some embodiments, the ServerHello message does not include the "ecjpake_key_kp_pair_list" in response to the client and the server handshaking the key by using the ECDH-based network configuration protocol. The ServerHello message further includes "ecjpake_key_kp_pair_list" in response to the client and the server handshaking the key by using the ECJPAKE-based network configuration protocol. The "ecjpake_key_kp_pair_list" is configured to indicate the first public key list.

In some embodiments, the method further includes: performing the operations S503 to step S511, or performing the operations S603 to step S608.

In an operation S805, the server sends the first warning message.

In some embodiments, the server being unable to support the third handshake-key mode includes the following. The second set of second cipher suites included in the second client greeting message does not include the cipher suite supported by the server. Alternatively, the first set of first cipher curves included in the second client greeting message does not include the cipher curve supported by the server. Alternatively, the first set of protocol identifiers included in the second client greeting message does not include the protocol identifier supported by the server.

In some embodiments, the server sends the first warning message to the client, the first warning message is configured to indicate the client being disconnected from the server.

In some embodiments, the method further includes the following.

In an operation S806, the client sends a second warning message.

In some embodiments, the client sends the second warning message to the server and is disconnected from the server, in the condition that a message that is received by the client and sent by the server includes more than two cipher curves or more than two cipher suites or more than two version identifiers. The second warning message is configured to indicate the client being disconnected from the server.

In some embodiments, the message sent by the server includes: a first server feedback message and/or a first server greeting message.

Accordingly, the present disclosure provides a flexible data transmission method. A client having poor performance and low security requirements may take the ECDH-based network configuration protocol for transmitting data. A data transmission process does not need to be selected by a developer or selected in advance. The client or the server may determine the transmission process by itself based on actual needs. Furthermore, in the present disclosure, for a client having requirements of a high security level, the PIN code of the client is combined with the transmission process to enhance the difficulty of deciphering PIN code, and security of data transmission may be improved. Furthermore, in the present disclosure, each frame of the message transmitted by the client and/or the server is involved in computing the hash value of the verification data, such that handshaking data may not be tampered, and security and reliability of a handshaking process may be improved.

FIG. 15 is a flow chart of still another data transmission method according to an embodiment of the present disclosure.

In an operation S901, the client sends the client greeting message to the server.

In some embodiments, when the client greeting message is sent for a first time in a round of handshaking, the client greeting message includes at least one of the following: a protocol version field configured to indicate some or all of protocol version parameters supported by the client; a cipher suite field configured to indicate some or all of cipher suite parameters supported by the client; a cipher curve field configured to indicate some or all of cipher curve parameters supported by the client; a first public key field configured to indicate the first public key of the client; and a second public key field being null or being absent.

In an operation S902, receiving a request of resending the greeting message sent by the server, or a server greeting message sent by the server, or a warning message sent by the server, based on the client greeting message.

In some embodiments, the client greeting message is sent again in response to the request of resending the greeting message being a request of resending the greeting message that is sent by the server for a first time in one round of handshaking; and/or the warning message is sent, and the server and the client are disconnected with each other, in response to the request of resending the greeting message being a request of resending the greeting message that is sent by the server for a second time in one round of handshaking; and/or the warning message is sent, and the server and the client are disconnected with each other, in response to a received server greeting message sent by the server missing any mandatory field; and/or the warning message is sent, and the server and the client are disconnected with each other, in response to a protocol version number field of the received server greeting message sent by the server including multiple protocol versions; and/or the warning message is sent, and the server and the client are disconnected with each other, in response to a cipher suite field of the received server greeting message sent from the server including multiple cipher suite parameters or the cipher suite parameter being unsupported; and/or the warning message is sent, and the server and the client are disconnected with each other, in response to a first public key field of the received server greeting message sent from the server including multiple first public keys.

In an operation S903, generating the client shared key based on the public key sent by the server.

In some embodiments, the client shared key is generated based on the server public key carried by a request of resending the feedback message or the server greeting message, in response to the client being able to support the handshake-key mode indicated by the request of resending the feedback message or by the server greeting message sent by the server.

In this way, the present application embodiment provides a flexible data transmission method. A data transmission process does not need to be selected by a developer or selected in advance. The client or the server may determine the transmission process by itself based on actual needs. Furthermore, in the present disclosure, each frame of the message transmitted by the client and/or the server is involved in computing the hash value of the verification data, such that handshaking data may not be tampered, and security and reliability of a handshaking process may be improved.

Figure 16:
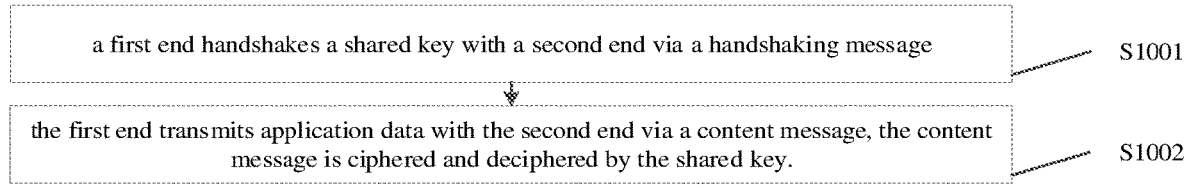
FIG. 16 is a flow chart of still another data transmission method according to an embodiment of the present disclosure.

FIG. 16 is a flow chart of still another data transmission method according to an embodiment of the present disclosure. Each operation will be illustrated in the following.

In an operation S1001, a first end handshakes a shared key with a second end via a handshaking message.

In some embodiments, when the first end is the client, the second end is the server; or when the first end is the server, the second end is the client.

The client handshaking the shared key with the server via the handshaking message includes the operations S101 to S108, or includes the operations S200 to S206, or includes the operations S301 to S304, or includes the operations S401 to S407, or includes the operations S501 to S511, or includes the operations S601 to S608, or includes the operations S801 to S806, or includes the operations S901 to S903; and specific processes illustrated in FIGS. 5, 7, 10, 12 and 14, which will not be repeated herein. Accordingly, the handshaking message includes at least one of the first client greeting message, the first server feedback message, the second client greeting message, the first server greeting message, the third client greeting message, the first warning message, and the second warning message.

In some embodiments, the handshaking message includes a handshaking greeting message and a handshaking responding message. The handshaking greeting message includes at least one of: the first client greeting message, the second client greeting message, and the third client greeting message. The handshake responding message includes: the first server greeting message. The resending request message includes the first server feedback message.

A message load of the handshaking greeting message or a message load of the handshaking responding message includes a public key list field. A value of the public key list field is null. The null value is configured to determine whether the second end supports a target cipher suite. The public key list field is indicated by the "ecjpake_key_kp_pair_list" field.

In some embodiments, the method further includes the following. While handshaking the key, the first end verifies the handshaking message to obtain a verification value. The handshaking message includes a handshaking completion message configured to indicate a process of handshaking the key is completed, and the handshaking completion message carries the verification value.

In some embodiments, the handshaking completion message may include the first verification data in the operations S204, S303, S507, and S605; and/or include the second verification data in the operations S205, S304, S509, and S606. Accordingly, the verification value may be the hash values carried in the first verification data and/or the second verification data.

In an operation S1002, the first end transmits application data with the second end via a content message, the content message is ciphered and deciphered by the shared key.

In some embodiments, the content message includes the target data transmitted by the first end and the second end. The first end and the second end cipher and decipher the content message transmitted by the first end and the second end by using the shared key.

In some embodiments, the method further includes: ciphering a message load in the content message by using the shared key. The message load includes: the protocol version field, the cipher suite field, the shared key field, and the cipher curve field.

The protocol version field includes the "supported_version" field in the operations shown in FIGS. 3 to 16. The cipher suite field includes the "cipher_suites" field in the operations shown in FIGS. 3 to 16. The shared key field includes at least one of the "key_share" field of the operations shown in FIGS. 3 to 16, the "ecjpake_key_kp_pair_list" field of the operations shown in FIGS. 3 to 16, and the "ecjpake_key_kp_params" field of the operations shown in FIGS. 3 to 16. The cipher curve field includes the "supported_group" field in the operations shown in FIGS. 3 to 16.

In some embodiments, the handshaking greeting message includes the first client greeting message included in the operations shown in FIGS. 3 to 16, the second client greeting message included in the operations shown in FIGS. 3 to 16, and the third client greeting message included in the operations shown in FIGS. 3 to 16. The handshaking responding message includes the first server greeting message included in the operations of FIGS. 3 to 16. The resending request message includes the first server feedback message and/or the second server feedback message included in the operations of FIGS. 3 to 16. The verification data message includes the first authentication message and/or the second authentication message included in the operations of FIGS. 3 to 16. The handshaking completion message includes the first verification data and/or the second verification data included in the operations of FIGS. 3 to 16.

In some embodiments, the first client greeting message, the first server feedback message, the second client greeting message, the first server greeting message, and the third server greeting message that are included in the operations of FIGS. 3 to 16 have a same message format. The message format includes: a message count and a message load. The message count includes a key algebra (Epoch) identifier and a message count (Seq). The key algebra is represented by a bit information less than the first number of bits, and the message count is represented by a bit information less than the second number of bits.

In some embodiments, the first number of bits may be 2; the second number of bits may be 8.

In some embodiments, message loads of the first client greeting message, the first server feedback message, the second client greeting message, the first server greeting message, the third server greeting message include at least one or more of the following fields: the protocol version field, the cipher suite field, the shared key field, the cipher curve field.

The key algebra is represented by E, the E represents a lowest bit of Epoch. The Epoch is configured to indicate a form of a symmetric key that is currently in use. As shown in Table 1, no key is used in the case of Epoch 0; a first key is used in the case of Epoch 1; and a second key is used in the case of Epoch 2, and so on.

In some embodiments, when the first end handshakes the key with the second end via the handshaking greeting message, the handshaking responding message, or the resending request message, the key algebra identifier is a. When the first end handshakes the key with the second end via the verification data message or the handshaking completion message, the key algebra identifier is a+1. When the first end transmits the application data with the second end via the content message, the key algebra identifier is a+2 to a+N. The a is an integer, and the N is an integer greater than or equal to 2. A key algebra for transmitting an earlier application data is less than a key algebra for transmitting a later application data.

For example, in the case of a=0, operations of S501 to S505 may be performed in the Epoch0 stage, and messages transmitted between the client and the server are not ciphered. Operations of S506 to S509 may be performed in the Epoch1 stage, and messages transmitted between the client and the server are ciphered and/or deciphered by the first key. Transmitting the application data may be Epoch2 to EpochN, and messages transmitted between the client and the server are ciphered and/or deciphered by the shared key.

In some embodiments, the message count includes 8 bytes, each of the 8 bytes occupies 8 bits (8 bits of information). The first 2 bytes of the message count represents the Epoch (occupying 16 bits). In the present embodiment, E is represented by bit information having the number of bits less than the first number. The E may be the lowest 1 bit corresponding to Epoch (occupying 1 bit). Alternatively, E may be the lowest 0 bit corresponding to Epoch (not occupying the bit information).

In some embodiments, the message load of the handshaking greeting message or the message load of the handshaking responding message includes the ecjpake_key_kp_pair_list field. A value of the public key list field is null, and the null value is configured used to determine whether the second end supports the target cipher suite.

In some embodiments, the second end returns the resending request message based on the handshaking greeting message. The cipher suite field in the resending request message is configured to be the target cipher suite.

TABLE 1

| Epoch | Stage | Client key | Server key |
|---|---|---|---|
| 0 | Hello | Not ciphered | Not ciphered |
| 1 | Handshake | ClientHandshake Key | ServerHandshake Key |
| 2 | Application | ClientHandshake Key0 | ServerHandshake Key0 |
| ... | ... | ... | ... |
| N | Application | ClientHandshake KeyN | ServerHandshake KeyN |

At different stages, the data sent and/or received by the client and the server are ciphered and deciphered by using different keys. When the handshaking is completed, the Epoch 2 is entered. When the key needs to be updated subsequently, the client and the server may update the key simultaneously, i.e., the Epoch N is entered.

Figure 17:
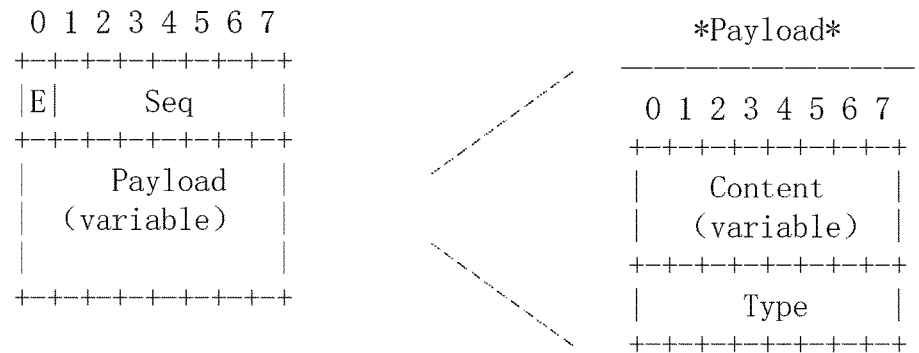
FIG. 17 is a structural schematic view of contents of messages transmitted by the client and the server according to an embodiment of the present disclosure.

FIG. 17 is a structural schematic view of contents of messages transmitted by the client and the server according to an embodiment of the present disclosure.

In FIG. 17, the Seq is the message count. A message configured to be corresponding to the Seq is a serial number of the message transmitted by the client and/or the server (i.e., the message corresponding to the Seq is the certain-number-th message transmitted by the client and/or the server).

In some embodiments, the message count includes 8 bytes, each of the 8 bytes occupies 8 bits (8 bits of information). The last 6 bytes of the message count represents the Seq (occupying 48 bits). In the present embodiment, the message count identifier is represented by, at the lowest, the third number of bits of information of the message count. The value of the message count identifier is equal to a sum of 1 and values of adjacent message count identifiers that are transmitted earlier. The third number of bits is less than the second number of bits. When the second number of bits is 8, the third number of bits may be 7. Accordingly, the message count identifier is, at the lowest, 7 bits of the message count. Alternatively, when the second number of bits is 8, the third number of bits may be 6. Accordingly, the message count identifier is, at the lowest, 6 bits of the message count. That is, in the present embodiment, less than or equal to 8 bits of information are used to represent the message serial number, such that the number of bytes of the message serial number is reduced by 1 to 2 compared to a byte length of the current standard ECJPAKE-based network configuration protocol. Representation of the message serial number in the present disclosure is more streamlined, and the amount of transmitted data may be reduced.

In some embodiments, the message load includes actual data and a message type.

The message type includes a filling type, an application data type, a warning type and a handshaking type.

In FIG. 17, Payload is the actual data and includes: transmitted data carried in the verification data ciphered by the first key; or transmitted data carried in the application data ciphered by the shared key; or transmitted data carried in the handshaking message. The transmitted data carried in the verification data ciphered by the first key may be a set of hash values included in the verification data. The transmitted data carried in the application data ciphered by the shared key may be application data to be transmitted (such as turning on lights, turning off lights, starting sweeping, pulling the curtains, and so on). The transmitted data carried in the handshaking message may be at least one of the public key, the random sequence, the cipher curve, the cipher suite, the protocol identifier, and the public key list.

In FIG. 17, "+" indicates an extension attached to the message; and "{ }" indicates the Epoch 1. That is, the message is ciphered by using a key function derived from [sender]HandshakeTraffic. "[ ]" indicates the Epoch 2. That is, the message is ciphered by using a key function derived from [sender] ApplicationTraffic.

In FIG. 17, the message format includes: E, Seq and Payload. The Payload includes Content and Type.

The Payload includes the message load. The Payload data is ciphered, except for the 0-th generation key (Epoch 0).

The message load includes the actual data and the message type. The message type includes the filling type, the application data type, the warning type and the handshaking type.

Definitions of the message types (Type) are shown in Table 2.

TABLE 2

| Type | Symbol | Information |
|---|---|---|
| 0 | Padding | Filling byte 0 |
| 1 | Application Data | Application layer information |
| 2 | Alter | notification message |
| 3 | Handshake | handshaking message |

The filling type includes Padding in Table 2, which is configured to fill the Payload to reach an appropriate length. A Content part corresponding to the Padding is still in the Payload format. That is, the last byte needs to be re-judged according to the message type. When parsing, the Padding at the end of the Payload may be skipped directly.

As shown in Table 2, the application data type includes the Application Data in Table 2 and includes transmitting application data between the first client and/or the server. The application data may be such as turning on lights, turning off lights, collection of environmental information, collection of biometric information, and so on.

The warning type includes the notification message in Table 2, and specifically includes messages informing the ECDH-based network configuration protocol or the DCJPAKE-based network configuration protocol of a successful handshake and a failed handshake, such as the first warning message, the second warning message, and so on.

The handshaking type includes the handshaking message in Table 2, and specifically includes at least one of the first message, the second sequence, the first verification data, the first authentication message, the second verification data, the second authentication message, the third sequence, the first resending request, and the first greeting message.

As shown in Table 2, Alert is configured to send the warning messages, and the codes include the following:

```
enum {
close_notify(0),
unexpected_message(10),
handshake_failure(40),
protocol_version(70),
decrypt_error(51),
}AlertCode;
struct{
uint8 code;
}Alert;
```

The client and/or the server must be disconnected with each other in response to the warning message being received.

In some embodiments, in response to the content of the Payload being the Handshake, codes for the Handshake message includes the following.

```
enum: uint8 {
Client_hello(1),
Server_hello (2),
hello_retry_request(3),
authenticate (4),
finished(20),
MAX(255)
} Handshaketype;
struct {
Handshaketype hs_type;    /hankshaking message type
uint16 len;                               /*handshaking message length*/
switch(hs_type) {                        Clienthello
case Client_hello;
case Server_hello;                       Serverhello
case hello_retry_request:  Helloretryrequest;
case authenticate;                       Authenticate
case finished;                           Finished
}
} Handshake
struct {
Handshake[ ] handshakes;
} Handshakepayload;
```

In some embodiments, the Handshake is configured to send the handshaking message, the handshaking message includes at least one of: the first message, the second sequence, the first verification data, the first authentication message, the second verification data, the second authentication message, the third sequence, the first resending request, the first greeting message.

In some embodiments, in response to at least one handshaking message of the Epoch being the same, the end that sends the at least one handshaking message may merge the at least one handshaking message, so that only one cipher needs to be performed.

Accordingly, when the end that receives the message is deciphering the data, a boundary of each handshaking message is determined by Handshake.len, and all Handshakes included in one message are determined based on the length of the entire message.

In FIG. 14, codes for the ClientHello sent by the client includes the following.

```
Opaque Random[8];
Struct {
Random random;
Extension[ ] extensions;
} ClientHello;
```

The random consists of 8 bytes of random data, and is configured to prevent replay attacks. The extension is an extension that is configured to describe a capability of the client and related parameters of the client. All extensions in the Extension must be ordered from a smallest to a largest based on extension types.

ClientHello is the first message handshaken by the protocol and is sent from the Client to the Server. The ClientHello is configured to inform the Server about the authentication capability of the Client and customized parameters of the client.

In FIG. 14, codes for the ServerHello sent by the Server includes the following.

```
opaque Random[8];
struct {
Random random;
Extension[ ] extensions;
} ServerHello;
```

The random consists of 32 bytes of random data, and is configured to prevent replay attacks. The extension is an extension that is configured to describe a capability of the server and related parameters of the server. All extensions in the Extension must be ordered from a smallest to a largest based on extension types. Only when a certain extension is given in the ClientHello (meaning that the Client supports the certain extension), a corresponding extension is allowed to be responded in a ServerHello respond.

The ServerHello is sent from the server to the client and is configured to determine connection parameters of a conversation.

The ClientHello is the first message handshaken by the protocol and is sent from the client to the server. The ClientHello is configured to inform the server about the authentication capability of the client and customized parameters of the client.

When the client is processing the ServerHello, the client must send an unexpected_message warning to the server and disconnect from the server in response to the ServerHello including any unsupported extension. The server must send an unexpected_message warning to the client and disconnect from the client in response to the server fining a mandatory extension being absent.

In FIG. 14, codes for the HelloRetryRequest message include the following.

```
struct {
Extension[ ] extensions;
} HelloRetryRequest;
```

The extensions represent extensions configured to describe the capability of the server and related parameters of the server. After the client for the first time sends the ClientHello to the server, the server may send the HelloRetryRequest to request the client to re-initiate a handshaking. In a common situation, the server does not support a key_share curve provided by the client. For example, the client provides a secp256r1 curve, but the server only supports a C25519 curve. In this case, the server needs to find the supported_group extension from the ClientHello, finds a curve from the supported_group that can be used for handshaking, and uses the HelloRetryRequest message to notify the client to perform re-handshaking.

While the client and the server are handshaking the shared key, the Retryrequest is allowed to be transmitted for only once. For the server, in response to parameters of the Clienthello that is sent for the second time being still unacceptable, the server must send a handshake_failure warning and close the connection. For the client, in response to receiving a second HelloRetryrequest, the client must send an unexpected_message and disconnect form the server.

The HelloRetryRequest message is configured to respond to an erroneous ClientHello message in the ECDH-based network configuration protocol; or configured to transmit ECPAKE Round 1 data in the ECJPAKE-based network configuration protocol.

In some embodiments, responding to the erroneous ClientHello message in the ECDH-based network configuration protocol includes the operations S301 to S302 and will not be repeatedly described herein. Transmitting the ECPAKE Round 1 data in the ECJPAKE-based network configuration protocol includes the operations S401 to S402 and will not be repeatedly described herein.

In FIG. 14, codes for the Authenticate message includes the following.

```
struct {
Select (Authentication) {
Case ECJPAKE: ECJPAKEParams;
Case Certificate: CertificateAuth;
};
Extension[ ] extensions;
} Authenticate;
```

The Authenticate message is configured to transmit the verification data. The message format varies according to a value of an Authentication column defined by cipher_suites. In particular, when the Authentication value is None, the message must be omitted. The Authenticate is constructed in different manners for different authentication methods.

When the authentication method is performed by using the ECDH-based network configuration protocol, codes for the Authenticate message include the following.

```
enum {
X509(0),
HeyThingsDomainCertificate(242),
(255)
} CertificateType;
struct {
CertificateType type;
Uint16 cert_len;
opaque[sig_len] signature;
} CertificateAuth;
struct {
struct CertificateAuth Cert;
Extension[ ] extensions;
} Authenticate;
```

The Authenticate message is configured to authenticate the certificate of the ECDH, and two types of certificates are supported: a X509 certificate and a customized certificate.

In FIG. 14, codes of the Finished message include the following.

```
struct {
    opaque[Hash.length] verify_data
} Finished;
```

The verify_data is a HMAC calculated by using a current Transcripthash value. A calculation method includes the following.

Verify_data=HMAC(key=FinishedKey,message=TranscriptHash)

TranscriptHash: Server: TranscriptHash(ClientHello1 . . . Server Authenticate).
    Client: TranscriptHash(ClientHello1 . . . Server Authenticate, Server Finished, Client Authenticate).
    Finished Key: Server: Expand (PRK=ServerHandshakeTraffic, label="htbts finished", len=Hash Length).
    Client: Expand(PRK=ClientHandshakeTraffic, label="htbts finished",len=Hash Length).

In FIG. 14, the Content part of the Application Data message is complete user data.

In the message codes, the extension is supplementary description for the message, and the codes include the following.

```
struct {
    extensionType extension_type;
    uint16 data_size;
    opaque[data_size] extension_data;
} Extension;
```

The extension_data represents extension data defined in each extension type. The data_size represents a length of the data. An encoding method may refer to a variable-length integer. The data_size is not larger than 16383 bytes. That is, the data_size may only be 1 byte or 2 bytes after being encoded. When the data is encoded into 2 bytes, a highest bit of the first byte is 1, and a highest bit of the second byte is not 1. When decoding, in response to the data_size being not found as not meeting the requirements, the unexpected_message should be sent, and connection should be closed. The extension_type represents a message type of the Extension, as shown in Table 3.

TABLE 3

| Type | Sym | applicable to |
|---|---|---|
| 0 | supported_version | CR(mandatory), SR(mandatory), HRR(mandatory) |
| 1 | cipher_suits | CR(mandatory), SR(mandatory), HRR(mandatory) |
| 2 | supported_group | CR, SR, HRR |
| 4 | key_share | CR(mandatory), SR(mandatory) |
| 5 | Ecjpake_key_kp_pair_list | CR, SR |
| 6 | Ecjpake_key_kp_params | CR, SR |

The term "applicable to" is configured to identify the handshaking message that is allowed to use the corresponding extension. A message name is indicated by the abbreviation: CR (ClientHello), SR (ServerHello), HRR (HelloRetryRequest), AU (Authenticate).

The "mandatory" means that the item must be present in the responding message. When a mandatory extension is missing from the message sent to the end, the unexpected_message must be sent, and the connection must be disrupted.

In Table 3, Type 0 represents the version number. The Type1 represents the cipher suite, which may be the ECDH, (Diffle-Hellman, DH), and so on. The Type2 represents a type of used curve, such as an elliptic curve. The Type4 represents an interactive public key. The Type5 and Type6 represent public keys at different stages, respectively.

In FIG. 14, codes for supported_version include the following.

```
uint8 Version;
struct{
    Version [0..255] versions;
} ExtensionSupportedVersion;
```

The supported_version indicates the protocol version supported by the client or the server. The current protocol version is 1.

The supported_version must be added to the ClientHello, the ServerHello, and the HelloRetryRequest, and one Version is filled. The Version filled in by the server will be used as the protocol version for the current connection.

In some implementations, when the client finds a plurality of versions being included in the supported_version extension in the received ServerHello or finds a version that cannot be supported by the client itself, the clent should send the protocol_version warning and close the connection.

In FIG. 14, codes for cipher_suites include the following.

```
uint CipherSuite;
struct{
    CipherSuite[0..255] cipher_suites;
} ExtensionCipherSuites;
```

The cipher_suites indicates the cipher suite supported by the client or the server. The cipher_suites include the CipherSuite, the Sym, the KeyExchange, the Authentication, the Cipher, the MAC Tag, and the Hash.

The CipherSuite is configured to indicate a value of the uint8 of the cipher suite. The Sym is configured to indicate a name of the cipher suite and is used to unify naming of the implementations. The keyExchange is configured to indicate a key exchanging method, affecting the key_share extension. The Authentication is configured to indicate the authentication method, affecting the Authenticate message. The Cipher is configured to indicate how the data is ciphered and is being used for ciphering data. The MAC Tag is configured to indicate the length of the MAC Tag of the cipher suite. The Hash is configured to indicate a hash function used by the HKDF, HMAC, and other functions used while the protocol is operating.

In some embodiments, the client fills one or more CipherSuite in the ClientHello. The server selects one of ServerHello and HelloRetryRequest and fills a CipherSuite in the selected one. The CipherSuite filled by the server may be the CipherSuite used for the current connection.

In some embodiments, the 0x00 (None) cipher suite is not allowed to be used for non-debugging purposes.

In some implementations, the client should send the unexpected_message warning and close the connection when the client finds a plurality of cipher_suites being included in the cipher_suites extension in the received ServerHello or finds that the cipher_suites are not supported by the client itself.

In FIG. 14, codes for supported_group include the following.

```
uint8 NamedGroup
struct {
    NamedGroup[0..255] named_group_list;
} ExtensionSupportedGroup;
```

In some embodiments, parameters of the EC curves that can be supported are defined in Table 4.

TABLE 4

| NamedGroup | sym |
|---|---|
| 0x17 | secp256r1 |
| 0x18 | secp384r1 |
| 0x19 | secp521r1 |
| 0x1D | x25519 |
| 0x1E | x448 |

The client fills one or more NamedGroups that are supported by the client in the ClientHello. However, the Server selects one from the ServerHello and the HelloRetryRequest, and fills one NamedGroup. The NamedGroup filled by the server may be used as the EC curve for the current connection.

In some embodiments, the client should send the unexpected_message warning and close the connection when the client finds that a plurality of NamedGroups are included in the supported_group extension in the received ServerHello or finds that the NamedGroup is not supported by the client itself.

In FIG. 14, codes for key_share include the following.

```
struct {
    NamedGroup group;
    uint8 len
    opaque[len] key_exchange;
} key_shareEntry;
struct {
    key_shareEntry[ ] key_shares;
} Extensionkey_share;
```

The key_share is configured to share keys with each other for handshaking the key. The key_share may be used in the ClientHello message, the ServerHello message, and the HelloRetryRequest message.

In some embodiments, in the ClientHello, a plurality of key_shares are allowed to be selected by the server. In the ServerHell, only one key_shares is allowed for selecting a handshake-key. In the HelloRetryRequest, only one key_shares is allowed, and the len is 0. The only one key_shares is configured to inform the client to re-send the ClientHello.

In some embodiments, the client should send an unexpected_message warning and close the connection when the client finds that, in the received ServerHello, a plurality of key_shareEntry in the extension or finds that the NamedGroup is not supported by the client itself.

```
struct {
    ECJPAKEKeyKP ecjpake_key_kp_list[2];
}ExtensionECJPAKEKeyKPPairList;
```

In some embodiments, when it is not sure whether the server supports the ECJPAKE authentication, the client should carry a null ecjpake_key_pair_list in the first ClientHello1. When the server selects the ECJPAKE for authentication, the server needs to select the cipher_suites in the ECJPAKE class, fills the ECJPAKE Round1 data of the server itself, and sends the HelloRetryRequest to request the client to perform re-authentication.

In some embodiments, the message load of the handshaking greeting message or the message load of the handshaking responding message includes the ecjpake_key_kp_pair_list field, the ecjpake_key_kp_pair_list field has a value of null, and the null value is configured to determine whether the second end supports the target cipher suite.

In some embodiments, a format definition is the same as the definition in the Elliptic Curve J-PAKE Cipher for Transport Layer (TLS) Section 7.2.2[17], and corresponds to the "ECJPAKEKeyKPPairList" extension in the ClientHello/ServerHello. The identtity field is removed, and a predefined "Client"/"Server" is achieved by using mbedTLS.

In FIG. 14, codes for ecjpake_key_kp_params include the following.

```
// data structure in the ServerHello
struct {
    ECParameters curve_params;
    ECJPAKEKeyKP ecjpake_key_kp;
} ServerECJPAKEParams;
// data structure in the ClientHello
struct {
    ECJPAKEKeyKP ecjpake_key_kp;
} ClientECJPAKEParams;
```

The format definition is the same as the definition in the Elliptic Curve J-PAKE Cipher for Transport Layer (TLS) Section 7.3[18] and corresponds to "ServerECJPAKEParams" or "ClientECJPAKEParams" in ServerKeyExchange/ClientKeyExchange.

In some embodiments, the "ecjpake_key_kp_params" are configured to indicate the public key in the protocol of the ECJPAKE, such as the fifth public key, the sixth public key, and so on.

In FIG. 14, the TrainscriptHash is a Hash context that needs to be maintained during the handshaking process to guarantee integrity of the data during the handshaking process. Contents of each message sent and received by the client and the server need to be written to the Hash context. The client initializes the TranscriptHash when the client receives the ServerHello or the HelloRetryRequest. The server initializes the TranscriptHash when the server receives a first packet of ClientHello.

In some embodiments, a TranscriptHash construction method includes the following.

Transcript-Hash(M1,M2, ... Mn) = Hash(M1 || M2 || ... || Mn)

Usually, the HelloRetryRequest is not used, such that the HelloRetryRequest and the second ClientHello are omitted from the entire interaction.

In this case, the TranscriptHash includes the following.

Hash(ClientHello || ServerHello || ... Mn)

In some embodiments, codes for the message serial number includes the following.

```
struct {
    uint16 epoch;
    uint48 seq;
        } RecordNumber;
```

The message serial number includes two parts: the epoch and the seq, in the total of 64 bits. The client and the server are processed separately. The epoch is the key algebra. When the connection is just established, the epoch is 0. The seq is increased by 1 for each message that is sent and received, including the epoch 0.

Figure 18:
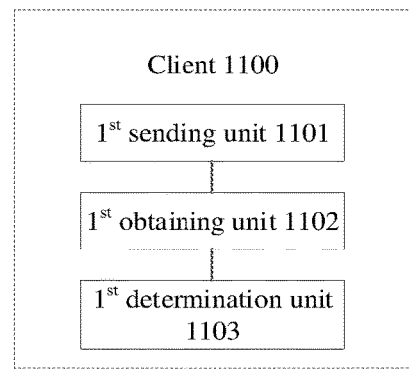
FIG. 18 is a structural schematic view of a client according to an embodiment of the present disclosure.

FIG. 18 is a structural schematic view of a client according to an embodiment of the present disclosure. Each operation will be illustrated in the following.

In some embodiments, the client 1100 includes: a first sending portion 1101, a first obtaining portion 1102, and a first determining portion 1103.

The first sending portion 1101 is configured to send the first client greeting message, the first client greeting message includes the first information, the first information is configured to indicate the first handshake-key mode that can be supported by the client.

The first obtaining portion 1102 is configured to obtain the first server feedback message sent by the server based on the first client greeting message, the first feedback message is configured to indicate the second handshake-key mode determined by the server, the first server feedback message includes a request of resending the greeting message or the server greeting message.

The first determination portion 1103 is configured to determine the first client shared key based on the second handshake-key mode in response to the first handshake-key mode including the second handshake-key mode, is configured to transmit the target data based on the first client shared key.

The first sending portion 1101 is configured to send the second client greeting message in response to the first handshake-key mode not including the second handshake-key mode. The second message is configured to indicate the third handshake-key mode that can be supported by the client.

The first obtaining portion 1102 is configured to obtain the second server feedback message sent by the server based on the second client greeting message. The second feedback message is configured to indicate the fourth handshake-key mode determined by the server.

The first determination portion 1103 is configured to determine the second client shared key based on the fourth handshake-key mode, and to transmit the target data based on the second client shared key.

The first obtaining portion 1102 is configured to obtain the first warning message sent by the server based on the second client greeting message, and configured to be disconnected form the server based on the first warning message. Alternatively, the first obtaining portion 1102 is configured to: obtain the third server feedback message sent by the server based on the second client greeting message; to send the second warning message based on the third server feedback message; and to be disconnected from the server.

In some embodiments, each of the first client greeting message, the second client greeting message, the first server feedback message, and the second server feedback message includes a predefined field. The predefined field includes at least one of: the protocol version field, the cipher suite field, the cipher curve field, the first public key field, and the second public key field. The protocol version field is configured to indicate some or all protocol version parameters supported by the client or the server. The cipher suite field is configured to indicate some or all of cipher suite parameters supported by the client or the server. The cipher curve field is configured to indicate some or all of the cipher curve parameters supported by the client or the server. The first public key field is configured to indicate the first public key of the client or the server. The second public key field is configured to indicate the second public key of the client or the server.

In some embodiments, the first client greeting message includes the protocol version field, the cipher suite field, the first public key field, the cipher curve field, and the second public key field. The first public key field includes the first public key of the client; the second public key field is null; and/or in response to the client and the server applying the first handshake-key algorithm, the second client greeting message includes the protocol version field, the cipher suite field, and the first public key field, and the first public key field includes the second public key of the client; and/or in response to the client and the server applying the second handshake-key algorithm and the client supporting the second handshake-key mode, the second client greeting message includes the protocol version field, the cipher suite field, the second public key field, and the second public key field includes the third public key of the client; and/or in response to the client and the server applying the second handshake-key algorithm and the client not supporting the second handshake-key mode, the second client greeting message includes the protocol version field, the cipher suite field, the cipher curve field.

In some embodiments, the first handshake-key algorithm is the ECDH algorithm, and the second handshake-key algorithm is the EJPAKE algorithm.

In some embodiments, the in response to the first handshake-key mode including the second handshake-key mode, includes the following. The protocol version parameter of the protocol version field of the first client greeting message includes the protocol version parameter of the protocol version field of the first server feedback message; the cipher suite parameter of the cipher suite field of the first client greeting message includes the cipher suite parameter of the cipher suite field of the first server feedback message; the cipher curve parameter of the cipher curve field of the first client greeting message includes the cipher suite parameter of the cipher suite field of the first client greeting message. The in response to the first handshake-key mode not including the second handshake-key mode, includes the following. The protocol version parameter of the protocol version field of the first client greeting message does not include the protocol version parameter of the protocol version field of the first server feedback message; or the cipher suite parameter of the cipher suite field of the first client greeting message does not include the cipher suite parameter of the cipher suite field of the first server feedback message; or the cipher curve parameter of the cipher curve field of the first client greeting message does not include the cipher suite parameter of the cipher suite field of the first server feedback message.

In some embodiments, the operation of sending the first client greeting message is re-performed in response to the first client shared key or the second client shared key being used for the preset number of times or for a preset period of time.

Figure 19:
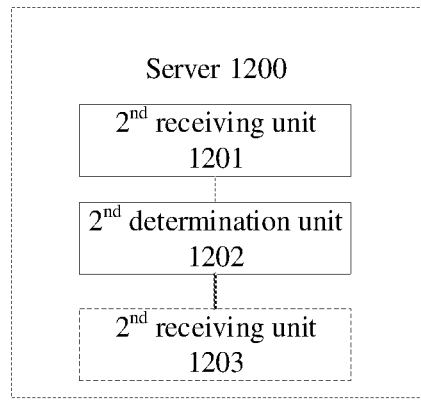
FIG. 19 is a structural schematic view of a server according to an embodiment of the present disclosure.

FIG. 19 is a structural schematic view of a server according to an embodiment of the present disclosure. Each part will be illustrated in the following.

In some embodiments, the server 1200 includes: a second receiving portion 1201 and a second determining portion 1202.

The second receiving portion 1201 is configured to receive the first client greeting message sent from the client, the first client greeting message is configured to indicate the first handshake-key mode that can be supported by the client.

The second determination portion 1202 is configured to determine the second handshake-key mode selected by the server based on the first handshake-key mode and to send the second handshake-key mode to the client via the first server feedback message; or, is configured to determine the first server shared key based on the second handshake-key mode in response to the first handshake-key mode including the second handshake-key mode, and configured to transmit the target data based on the first server shared key.

In some embodiments, in response to the first handshake-key mode not including the second handshake-key mode, the second receiving portion 1201 is configured to receive the second client greeting message sent from the client, the second client greeting message is configured to indicate the third handshake-key mode that can be supported by the client.

The second receiving portion 1201 is configured to send the second server feedback message based on the second client greeting message, the second server feedback message is configured to indicate the fourth handshake-key mode determined by the server.

The second determination portion 1202 is configured to determine the second server shared key based on the fourth handshake-key mode and configured to transmit the target data based on the second client shared key; or, configured to be disconnected from the server based on the third server feedback message sent by the second client greeting message.

In some embodiments, each of the first client greeting message, the second client greeting message, the first server feedback message, and the second server feedback message includes a predefined field. The predefined field includes at least one of: the protocol version field, the cipher suite field, the cipher curve field, the first public key field, and the second public key field. The protocol version field is configured to indicate some or all protocol version parameters supported by the client or the server. The cipher suite field is configured to indicate some or all of cipher suite parameters supported by the client or the server. The cipher curve field is configured to indicate some or all of the cipher curve parameters supported by the client or the server. The first public key field is configured to indicate the first public key of the client or the server. The second public key field is configured to indicate the second public key of the client or the server.

In some embodiments, the client and the server may apply the first handshake-key algorithm and/or the second handshake-key algorithm; and the first server feedback message includes the request of resending the greeting message or the server greeting message.

In some embodiments, the request of resending the greeting message is any one of a first request of resending the greeting message, a second request of resending the greeting message, a third request of resending the greeting message, a fourth request of resending the greeting message. The server greeting message is any one of the first server greeting message and the second server greeting message. The first request of resending the greeting message is configured to be sent in response to the server being able to apply the first handshake-key algorithm and not supporting the first handshake-key mode; and/or the second request of resending the greeting message is configured to be sent in response to the server being able to apply the second handshake-key algorithm and supporting the first handshake-key mode; and/or the third request of resending the greeting message is configured to be sent in response to the server being able to apply the second handshake-key algorithm and not supporting the first handshake-key mode; and/or the fourth request of resending the greeting message is configured to be sent in response to the server being able to apply the first handshake-key algorithm and supporting the first handshake-key mode. The first server greeting message is configured to be sent in response to the server being able to apply the second handshake-key algorithm and supporting the first handshake-key mode; and/or, the second server greeting message is configured to be sent in response to the server being able to apply the first handshake-key algorithm and supporting the first handshake-key mode.

In some embodiments, the first handshake-key algorithm is the ECDH algorithm, and the second handshake-key algorithm is the EJPAKE algorithm.

The present disclosure provides an embodiment, data is transmitted between the client and the server after secure authentication is performed. For example, in Bluetooth peer-to-peer transmission, the shared key is firstly generated through the secure authentication, and then the application data (i.e., the target data described below) is transmitted. Generally, the client and the server firstly determine the handshake-key mode that can be supported by both the client and the server, for example, the client and the server can support a same protocol version, a same cipher suite, a same cipher curve. The message transmitted between the client and the server includes the predefined fields, the predefined fields include at least one of: the protocol version field, the cipher suite field, the cipher curve field, the first public key field and the second public key field. The first public key field and the second public key field are configured to hold public keys corresponding to different handshake-key algorithms. For example, the first public key field is configured to hold the public keys using the ECDH algorithm and the second public key field is used to hold public key that uses the ECJPAKE algorithm, such that the second public key field may include at least one of the ecjpake_key_kp_pair_list field and the ecjpake_key_kp_params field. That is, the corresponding second public key may include three public keys corresponding to the ECJPAKE algorithm.

It shall be understood that a data transfer method, applied to the client and the server, may include the following.

In an operation C1, sending the first client greeting message (such as Clienthello). The first client greeting message is configured to indicate the first handshake-key mode that can be supported by the client.

In an operation S1, receiving the first client greeting message sent from the client. The first client greeting message is configured to indicate the first handshake-key mode that can be supported by the client.

It shall be understood that, the first handshake-key mode may include some or all of handshake-key modes that can be supported by the client. That is, some or all of parameters that can be supported by the client are carried in various fields of the first client greeting message. Exemplarily, the first client greeting message may be understood as the client greeting message (e.g. Clienthello) being sent for the first time in the current round of handshaking. Exemplarily, the first client greeting message includes the protocol version field, the cipher suite field, the first public key field, the cipher curve field, and the second public key field. The first public key field includes the first public key of the client. The second public key field is null. In a case, the second public key field may also be absent.

A handshake-key mode that is applicable to the server may be tried out and determined by allowing the first client greeting message to use the above fields and allowing the first public key field to carry the client first public key, and at the same time, the handshaking process may be saved. For example, when the server supports the ECDH algorithm, the above first public key may be directly obtained to enhance a handshaking speed.

In an operation S2, the second handshake-key mode selected by the server may be determined based on the first handshake-key mode and may be sent to the client via the first server feedback message. The first server feedback message includes the request of resending the greeting message or the server greeting message.

It shall be understood that the request of resending the greeting message may be any of the first request of resending the greeting message, the second request of resending the greeting message, the third request of resending the greeting message, and the fourth request of resending the greeting message. The server greeting message may be any of the first server greeting message and the second server greeting message.

The first request of resending the greeting message is configured to be sent in response to the server being able to apply the first handshake-key algorithm and not supporting the first handshake-key mode; and/or The second request of resending the greeting message is configured to be sent in response to the server being able to apply the second handshake-key algorithm and supporting the first handshake-key mode; and/or The third request of resending the greeting message is configured to be sent in response to the server being able to apply the second handshake-key algorithm and not supporting the first handshake-key mode; and/or The fourth request of resending the greeting message is configured to be sent in response to the server being able to apply the first handshake-key algorithm and supporting the first handshake-key mode.

The first server greeting message is configured to be sent in response to the server being able to apply the first handshake-key algorithm and supporting the first handshake-key mode and the first public key.

It is understood that the first request of resending the greeting message includes: the first public key field, and the first public key field is null.

Alternatively, the first request of resending the greeting message includes: the first public key field and the second public key field, and each of the first public key field and the second public key field is null.

The second request of resending the greeting message includes: the second public key field, and the second public key field is the second public key of the server.

Alternatively, the second request of resending the greeting message includes: the first public key field and the second public key field. The first public key field is null, and the second public key field is the second public key of the server.

The third request of resending the greeting message includes: the second public key field, and the second public key field is null.

Alternatively, the third request of resending the greeting message includes: the first public key field and the second public key field. Each of the first public key field and the second public key field is null.

The fourth request of resending the greeting message includes: the first public key field, and the first public key field is the first public key of the server.

Alternatively, the fourth request of resending the greeting message includes: the first public key field and the second public key field. The first public key field is the first public key of the server, and the second public key field is null.

The first server greeting message includes: the first public key field, and the first public key field is the first public key of the server.

Alternatively, the first server greeting message includes: the first public key field and the second public key field. The first public key field is the first public key of the server, and the second public key field is null.

A field for holding the public key of the server is added to the request of resending the greeting message, and the request of resending the greeting message has the first public key field and the second public key field, where the first public key field and the second public key field are applying different handshake-key algorithms. In this way, different handshake-key algorithms may be compatible, the handshaking process may be saved, and the handshaking speed may be improved.

It shall be understood that after receiving the first server feedback message sent from the client, the server deciphers the parameters in the first server feedback message, compares relevant parameters to corresponding parameters supported by the server itself, and determines one parameter that is supported by both the server and the client from parameters in each field. That is, the server determines the second handshake-key mode that can be supported by both the client and the server. In this case, in response to the server applying the ECDH algorithm, the server sends the first server feedback message (such as the serverhello), and the server sends the public key of the server through the first public key field (such as the key share field). In response to the server applying the ECPDJ algorithm, the server sends a pair of server public keys via the second public key field (such as the ecjpake_key_kp_pair_list field) of the first server feedback message (such as the HelloRetryRequest). In response to the handshake-key mode supported by both the server and the client cannot be found in the current handshaking, the server can only select a second handshake-key mode that is supported by the server itself, and sends the selected second handshake-key mode through the first server feedback message (such as ecjpake_key_kp_pair_list, applicable to the ECDH and ECJPAKE). In this case, since the handshake-key mode is not determined yet, the corresponding server public key does not need to be carried. In a special case, when the ECDH algorithm is applied, although the handshake-key mode supported by both the client and the server is determined for the first time, the curve of the first public key in the Clienthello that is sent for the first time is not supported by the server. Therefore, the server may send the HelloRetryRequest instead of the Serverhello, and may send the server public key via the keyshare field.

In an operation C2, the first server feedback message sent by the server based on the first client greeting message is obtained. The first server feedback message is configured to indicate the second handshake-key mode determined by the server, and the first server feedback message includes the request of resending the greeting message or the server greeting message.

It shall be understood that, the second handshake-key mode may be a mode that is selected by the server from the first handshake-key modes sent from the client and is supported by both the client and the server. After the handshake-key mode supported by both the client and the server is selected, transmitting the public key may be started. For example, when the client and the server apply the ECJPAKE algorithm, the server sends a pair of public keys of the server to the client (possibly through the HelloRetryRequest, or the ecjpake_key_kp_pair_list field of Serverhello carries a pair of public keys). After the client receives the pair of public keys of the server, the client sends a pair of public keys of the client and another public key through the second public key field in clienthello (such as the ecjpake_key_kp_pair_list field and the ecjpake_key_kp_params field). After the server receives the pair of public keys of the client and the another public key, the server sends another public key of the server via the second public key field in the Serverhello (such as the ecjpake_key_kp_params field in the Serverhello).

In an operation C3, the client shared key is determined, transmitting the target data through the client shared key.

For example, in response to the first handshake-key mode including the second handshake-key mode, the first client shared key is determined based on the second handshake-key mode, and the target data is transmitted based on the first client shared key.

In response to the first handshake-key mode not including the second handshake-key mode, the second client greeting message is sent, and the second message is configured to indicate the third handshake-key mode that can be supported by the client.

The second server feedback message sent by the server based on the second client greeting message is obtained. The second feedback message is configured to indicate the fourth handshake-key mode determined by the server. The second client shared key is determined based on the fourth handshake-key mode. The target data is transmitted based on the second client shared key.

Alternatively, the first warning message sent by the server based on the second client greeting message is obtained, and the server is disconnected with the client based on the first warning message.

Alternatively, the third server feedback message sent by the server based on the second client greeting message is obtained, the second warning message is sent based on the third server feedback message, and the server is disconnected with the client.

In an operation S3, the shared key for the server is determined, and the target data is transmitted by the shared key for the server.

For example, in response to the first handshake-key mode including the second handshake-key mode, the first server shared key is determined based on the second handshake-key mode, the target data is transmitted based on the first server shared key.

In response to the first handshake-key mode not including the second handshake-key mode, the second client greeting message sent from the client is received, and the second client greeting message is configured to indicate the third handshake-key mode that can be supported by the client.

The second server feedback message is sent based on the second client greeting message. The second server feedback message is configured to indicate the fourth handshake-key pattern determined by the server.

The second server shared key is determined based on the fourth handshake-key mode, and the target data is transmitted based on the second client shared key.

Alternatively, the third server feedback message is sent based on the second client greeting message, and the server and the client are disconnected with each other.

It is understood that when the client and the server apply the first handshake-key algorithm, the second client greeting message includes the protocol version field, the cipher suite field, the first public key field. The first public key field includes the second public key of the client, and the second public key is configured to determine the shared key of the client; and/or When the client and the server apply the second handshake-key algorithm, and when the client supports the second handshake-key mode, the second client greeting message includes the protocol version field, the cipher suite field, and the second public key field. The second public key field includes the third public key of the client, the third public key is configured to determine the shared key of the client; and/or When the client and the server apply the second handshake-key algorithm, and when the client does not support the second handshake-key mode, the second client greeting message includes the protocol version field, the cipher suite field, the cipher curve field.

The first handshake-key algorithm is the ECDH algorithm, and the second handshake-key algorithm is the ECJPAKE algorithm.

It shall be understood that, the client generates the shared key based on three public keys for the client sent from the server and based on the ECPJKE algorithm, and the server generates the shared key based on three public keys for the server sent by the client and based on the ECPJKE algorithm. Alternatively, the server generates the server shared key based on the ECDH algorithm through the server first public key in the first public key field (such as the key share field) of the message sent by the client. The client generates the client shared key based on the ECDH algorithm through the server first public key in the first public key field (such as the key share field) of the message sent by the server.

In an embodiment, each of the first client greeting message, the second client greeting message, the first server feedback message, and the second server feedback message includes a predefined field as described above. The predefined field includes at least one of: the protocol version field, the cipher suite field, the cipher curve field, the first public key field, and the second public key field.

The protocol version field is configured to indicate some or all of protocol version parameters supported by the client or the server.

The cipher suite field is configured to indicate some or all of cipher suite parameters supported by the client or the server.

The cipher curve field is configured to indicate some or all of cipher curve parameters supported by the client or the server.

The first public key field is configured to indicate the first public key of the client or the server.

The second public key field is configured to indicate the second public key of the client or the server.

The first public key and the second public key corresponding to different handshake-key algorithms.

It shall be understood that, the first handshake-key mode including the second handshake-key mode, includes the following.

The protocol version parameter of the protocol version field of the first client greeting message includes the protocol version parameter of the protocol version field of the first server feedback message.

The cipher suite parameter of the cipher suite field of the first client greeting message includes the cipher suite parameter of the cipher suite field of the first server feedback message.

The cipher curve parameter of the cipher curve field of the first client greeting message includes the cipher suite parameter of the cipher suite field of the first server feedback message.

Alternatively,

The first handshake-key mode not including the second handshake-key mode, includes the following.

The protocol version parameter of the protocol version field of the first client greeting message does not include the protocol version parameter of the protocol version field of the first server feedback message; or The cipher suite parameter of the cipher suite field of the first client greeting message does not include the cipher suite parameter of the cipher suite field of the first server feedback message; or The cipher curve parameter of the cipher curve field of the first client greeting message does not include the cipher suite parameter of the cipher suite field of the first server feedback message.

It shall be understood that the operation of sending the first client greeting message is re-performed, in response to the first client shared key or the second client shared key being used for the predetermined number of times or for the predetermined period of time. In this way, the shared key may be updated after being used for the certain number of times or for the certain period of time, and security may be improved.

To be noted that in the present disclosure, the server may be set to send the request of resending the greeting message (e.g. HelloRetryRequest) for only once. For example, when the ECJPAKE algorithm is applied, the client may send three client public keys by sending the client greeting message for once, and the server can send up to two public keys for once. Since, after the PIN code is verified, the third public key is generated and sent separately, the entire transmission process may be safer.

In some embodiments, a client is provided and includes the following.

A first sending portion is configured to send the first client greeting message, the first client greeting message is configured to indicate the first handshake-key mode that can be supported by the client.

A first obtaining portion is configured to obtain the first server feedback message sent by the server based on the first client greeting message, the first feedback message is configured to indicate the second handshake-key mode determined by the server, the first server feedback message includes a request of resending the greeting message or the server greeting message.

A first determination portion is configured to determine the first client shared key A first transmission portion is configured to transmit the target data through the client shared key.

Other functions of the above portions correspond to the method embodiments, and will not be repeated here.

In some embodiments, a server is provided and includes the following.

A second receiving portion is configured to receive the first client greeting message sent from the client, the first client greeting message is configured to indicate the first handshake-key mode that can be supported by the client.

A second determination portion is configured to determine the second handshake-key mode selected by the server based on the first handshake-key mode.

A second sending portion is configured to send the second handshake-key mode to the client via the first server feedback message. The first server feedback message includes the request of resending the greeting message or the server greeting message.

A second transmission portion is configured to determine the first server shared key and to transmit the target data through the first server shared key.

A storage medium stores an executable program. The executable program, when being executed by a processor, implements any of the above data transmission methods.

An electronic device includes a memory, a processor and an executable program stored on the memory and capable of being run by the processor. The processor executes the operations of any of the above data transmission methods when running the executable program. The processor may include a data transceiving module.

To be noted that the present disclosure provides a plurality of embodiments. Descriptions of the embodiments may have differences, but may represent same features or solutions. The descriptions may be interchangeable if not conflicted with each other.

Figure 20:
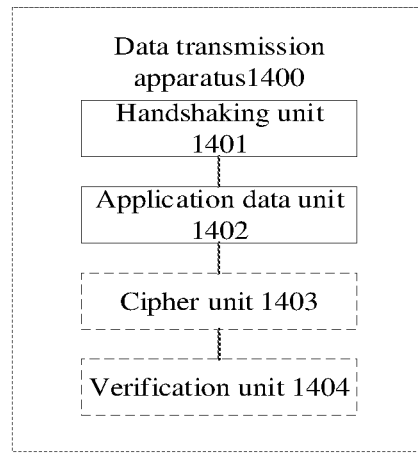
FIG. 20 is a structural schematic view of a data transmission apparatus according to an embodiment of the present disclosure.

FIG. 20 is a structural schematic view of a data transmission apparatus according to an embodiment of the present disclosure. Each part will be illustrated. In some embodiments, a data transmission apparatus 1440 includes a handshaking portion 1401 and an application data portion 1402.

The handshaking portion 1401 is configured to handshaking the key with a second end by the handshaking message.

The application data portion 1402 is configured to transmit the application data with the second end by the content message. The content message is ciphered and deciphered by using the shared key.

The handshaking message and the content message have a same message format. The message format includes: a message serial number and a message load. The message serial number includes a key algebra identifier and a message count identifier.

The key algebra identifier is represented by bit information having the number of bits less than the first number, and the message count identifier is represented by bit information having the number of bits less than the second number.

In some embodiments, the message load includes actual data and the message type. The message type includes the filling type, the application data type, the warning type and the handshaking type.

In some embodiments, the data transmission device 1400 further includes: a ciphering portion 1403.

The ciphering portion 1403 is configured to cipher the message load in the content message through the shared key.

In some embodiments, the data transmission apparatus 1400 further includes: a verification portion 1404.

The verification portion 1404 is configured to verify the handshaking message to obtain a verification value while handshaking the shared key.

In some embodiments, the handshaking message includes the handshaking completion message configured to indicate a process of handshaking the shared key being completed. The handshaking completion message carries the verification value.

In some embodiments, the handshaking message includes at least one of: the handshaking greeting message, the handshaking responding message, the resending request message, the verification data message, and the handshaking completion message.

In some embodiments, the message load of the handshaking greeting message, handshaking responding message, the resending request message include at least one or more of the following fields: the protocol version field, the cipher suite field, the shared key field, the cipher curve field.

In some embodiments, when the first end handshakes the key with the second end via the handshaking greeting message, the handshaking responding message, or the resending request message, the key algebra identifier is a. When the first end handshakes the key with the second end via the verification data message or the handshaking completion message, the key algebra identifier is a+1. When the first end transmits the application data with the second end via the content message, the key algebra identifier is a+2 to a+N. The a is an integer, and the N is an integer greater than or equal to 2.

In some embodiments, the message load of the handshaking greeting message or the message load of the handshaking responding message includes the public key list field, a value of the public key list field is null. The null value is configured to determine whether the second end supports the target cipher suite.

In some embodiments, the second end returns the resending request message based on the handshaking greeting message. The cipher suite field in the resending request message is configured as the target cipher suite.

In some embodiments, the first end is the client, and the second end is the server; or the first end is the server, and the second end is the client.

Figure 21:
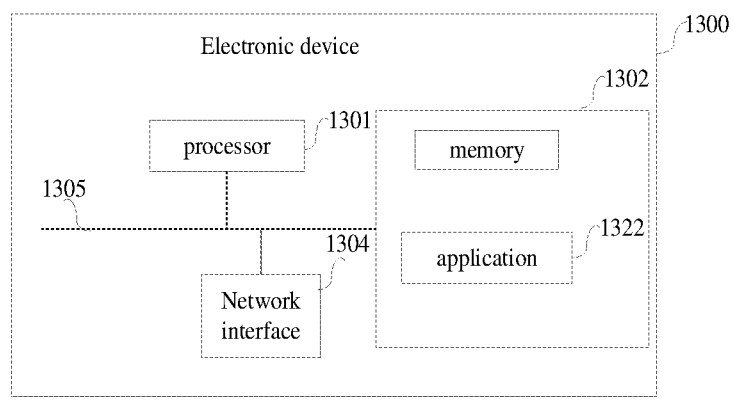
FIG. 21 is a structural schematic view of hardware components of an electronic device according to an embodiment of the present disclosure.

FIG. 21 is a structural schematic view of hardware components of an electronic device according to an embodiment of the present disclosure. The electronic device 1300 includes: at least one processor 1301, a memory 1302, and at least one network interface 1304. The individual components in the client or the server 1300 are coupled with each other via a bus system 1305. It shall be understood that the bus system 1305 is configured to enable communicative connection between these components. The bus system 1305 includes, in addition to a data bus, a power bus, a control bus and a status signal bus. For clarity, however, the various buses are labelled as a bus system 1305 in FIG. 15.

In some embodiments, the electronic device may be a hardware structure corresponding to the client or the server.

It shall be understood that the memory 1302 may be volatile memory or non-volatile memory, or may include the volatile memory and the non-volatile memory. The non-volatile memory may be ROM, a programmable read-only memory (PROM), an erasable programmable read-only memory (EPROM), an electrically erasable programmable read-only memory (EEPROM), a magnetic random access memory (FRAM), a flash memory, a magnetic surface memory, an optical disc, a compact disc read-only memory (CD-ROM); and the magnetic surface memory may be a magnetic disc memory or a magnetic tape memory. The volatile memory may be a random access memory (RAM), which is used as an external cache. As an illustration, but not limitation, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1302 described in the present disclosure includes, but is not limited to, these and any other suitable types of memories.

The memory 1302 in the present disclosure is configured to store various types of data to support the operation of the client or the server 1300. Examples of such data include: any computer program configured to perform operations on the client or the server 1300, such as an application 1322. Programs to implement the methods of the present disclosure may be included in the application 1322.

The method disclosed in the embodiments of the present disclosure may be applied in or implemented by the processor 1301. The processor 1301 may be an integrated circuit chip having capabilities of processing signals. In practice, various operations of the method may be accomplished by an integrated logic circuitry in hardware in the processor 1301 or by instructions in the form of software. The processor 1301 may be a general purpose processor, a digital signal processor (DSP), or other programmable logic devices, a discrete gate or a transistor logic device, a discrete hardware component, and so on. The processor 1301 may implement or perform the methods, the operations, and the logical block diagrams disclosed in the present disclosure. The general purpose processor may be a microprocessor or any conventional processor. The operations of the method disclosed in the embodiments of the present disclosure may be embodied directly as being performed by the hardware decoding processor or performed with a combination of hardware and software modules in the decoding processor. The software module may be located in a storage medium, which is located in the memory 1302. The processor 1301 reads the information in the memory 1302 and completes the operations of the above method in combination with the hardware.

In an embodiment, the client or the server 1300 may be implemented by one or more application specific integrated circuit (ASIC), a DSP, a programmable logic device (PLD), a complex programmable logic device (CPLD), a FPGA, a general purpose processor, a controller, a MCU, a MPU, or other electronic components, to perform the above method.

The present disclosure further provides a storage medium for storing a computer program.

In some embodiments, the storage medium may be applied to the first client in the present disclosure, and the computer program enables the computer to perform corresponding processes in the method of each embodiment, which will not be repeated here for brevity.

The present disclosure is described by referring to flow charts and/or block diagrams of methods, devices (systems), and computer program products according to embodiments of the present disclosure.

It shall be understood that each of the processes and/or blocks in the flow charts and/or block diagrams in combination of the processes and/or block in the flow charts and/or block diagrams may be implemented by computer program instructions. These computer program instructions may be provided to a processor of a general purpose computer, a dedicated computer, an embedded processor or other programmable data processing device to produce a machine such that the instructions executed by the processor of the computer or other programmable data processing device produce a device for implementing the functions specified in one or more processes of the flow charts and/or one or more blocks of the block diagram.

These computer program instructions may also be stored in a computer readable memory capable of directing a computer or other programmable data processing device to operate in a particular manner, such that the instructions stored in such computer readable memory produce an article of manufacture including an instruction device that implements the function specified in one or more processes of the flow chart and/or one or more blocks of the block diagram.

These computer program instructions may also be loaded onto a computer or other programmable data processing device such that a series of operations are executed on the computer or other programmable device to produce computer-implemented processing such that the instructions executed on the computer or other programmable device provide operations for implementing the functions specified in one or more processes of the flow chart and/or one or more blocks of the block diagram.

The above description is only preferred embodiments of the present disclosure and is not intended to limit the scope of the present disclosure. Any modification, equivalent substitution or improvement within the spirit and principles of the present disclosure shall be included within the scope of the present disclosure.

INDUSTRIAL PRACTICALITY

Embodiments of the present disclosure provide a data transmission method, a client, a server and a storage medium. The first client greeting message is sent. The first client greeting message includes the first information. The first information is configured to indicate the first handshake-key mode that can be supported by the client. The first server feedback message sent by the server based on the first client greeting message is obtained. The first feedback message is configured to indicate the second handshake-key mode determined by the server. The first server feedback message includes the request of resending the greeting message or the server greeting message. In response to the first handshake-key mode including the second handshake-key mode, the first client shared key is determined based on the second handshake-key mod, and transmitting the target data based on the first client shared key. In this way, the handshake-key mode may be flexibly determined, the shared handshake-key may be performed, and the target data may be transmitted via the handshaken shared key.

What is claimed is:

1. A data transmission method, performed by a client, comprising:
sending a first client greeting message, wherein the first client greeting message is configured to indicate a first handshake-key mode that is capable of being supported by the client;
obtaining a first server feedback message sent by a server based on the first client greeting message, wherein the first feedback message is configured to indicate a second handshake-key mode determined by the server, and the first server feedback message comprises a request of resending a greeting message or a server greeting message, wherein, when the second handshake-key mode determined by the user is handshaking a key using a ECDH-based network configuration protocol, the first server feedback message comprises: a second public key; when the second handshake-key mode determined by the user is handshaking a key using a ECJPAKE-based network configuration protocol, the first server feedback message comprises: a first public key list, and the first public key list comprises a public key pair sent from the server to the client for determining a shared key; and determining the shared key of the client based on the ECDH-based network configuration protocol or the ECJPAKE-based network configuration protocol, and transmitting target data based on the shared key of the client.

2. The method according to claim 1, wherein the determining a shared key of the client, and transmitting target data based on the shared key of the client, comprises:
determining a first client shared key based on the second handshake-key mode in response to the first handshake-key mode comprising the second handshake-key mode, and transmitting the target data based on the first client shared key;
sending a second client greeting message in response to the first handshake-key mode not comprising the second handshake-key mode, wherein the second client greeting message is configured to indicate a third handshake-key mode that is capable of being supported by the client;
obtaining a second server feedback message sent by the server based on the second client greeting message, wherein the second feedback message is configured to indicate a fourth handshake-key mode determined by the server; determining a second client shared key based on the fourth handshake-key mode, and transmitting the target data based on the second client shared key; or
obtaining a first warning message sent by the server based on the second client greeting message, and disconnecting from the server based on the first warning message; or
obtaining a third server feedback message sent by the server based on the second client greeting message, sending a second warning message based on the third server feedback message, and disconnecting from the server.

3. The method according to claim 2, wherein each of the first client greeting message, the second client greeting message, the first server feedback message, and the second server feedback message comprises a predefined field, the predefined field comprises at least one of: a protocol version field, a cipher suite field, a cipher curve field, a first public key field, and a second public key field;
the protocol version field is configured to indicate some or all protocol version parameters supported by the client or the server;
the cipher suite field is configured to indicate some or all cipher suite parameters supported by the client or the server;
the cipher curve field is configured to indicate some or all cipher curve parameters supported by the client or the server;
the first public key field is configured to indicate a first public key of the client or the server;
the second public key field is configured to indicate a second public key of the client or the server; and
the first public key field and the second public key field correspond to different handshake-key algorithms.

4. The method according to claim 3, wherein,
the first client greeting message comprises the protocol version field, the cipher suite field, the first public key field, the cipher curve field, and the second public key field, the first public key field comprises the first public key of the client; the second public key field is null;
and/or in response to the client and the server applying a first handshake-key algorithm, the second client greeting message comprises the protocol version field, the cipher suite field, and the first public key field; the first public key field comprises the second public key of the client; the second public key is configured to determine the shared key of the client; and/or in response to the client and the server applying the second handshake-key algorithm and the client supporting the second handshake-key mode, the second client greeting message comprises the protocol version field, the cipher suite field, and the second public key field; the second public key field comprises a third public key of the client; the third public key is configured to determine the shared key of the client; and/or in response to the client and the server applying the second handshake-key algorithm and the client not supporting the second handshake-key mode, the second client greeting message comprises the protocol version field, the cipher suite field, and the cipher curve field.

5. The method according to claim 4, wherein the first handshake-key algorithm is an ECDH algorithm, and the second handshake-key algorithm is an EJPAKE algorithm.

6. The method according to claim 3, wherein the in response to the first handshake-key mode comprising the second handshake-key mode, comprises:

a protocol version parameter of the protocol version field of the first client greeting message comprising a protocol version parameter of the protocol version field of the first server feedback message;

a cipher suite parameter of the cipher suite field of the first client greeting message comprising a cipher suite parameter of the cipher suite field of the first server feedback message;

a cipher curve parameter of the cipher curve field of the first client greeting message comprising the cipher suite parameter of the cipher suite field of the first client greeting message;

and/or, the in response to the first handshake-key mode not comprising the second handshake-key mode, comprises:

the protocol version parameter of the protocol version field of the first client greeting message not comprising the protocol version parameter of the protocol version field of the first server feedback message; or the cipher suite parameter of the cipher suite field of the first client greeting message not comprising the cipher suite parameter of the cipher suite field of the first server feedback message; or the cipher curve parameter of the cipher curve field of the first client greeting message not comprising the cipher suite parameter of the cipher suite field of the first server feedback message.

7. The method according to claim 2, wherein the sending the first client greeting message is re-performed in response to the first client shared key or the second client shared key being used for a preset number of times or for a preset period of time.

8. The method according to claim 1, wherein the second handshake-key mode is handshaking a key by using an ECDH-based network configuration protocol; or the second handshake-key mode is handshaking a key by using an ECJPAKE-based network configuration protocol.

9. The method according to claim 2, wherein the determining the first client shared key based on the second handshake-key mode, comprises:

handshaking the key by using an ECDH-based network configuration protocol or an ECJPAKE-based network configuration protocol.

10. A data transmission method, performed by a server, comprising:

receiving a first client greeting message sent from a client, wherein the first client greeting message is configured to indicate a first handshake-key mode that is capable of being supported by the client;

determine a second handshake-key mode selected by the server based on the first handshake-key mode, sending the second handshake-key mode to the client via a first server feedback message, wherein the first server feedback message comprises a request of resending a greeting message or a server greeting message, wherein, when the second handshake-key mode determined by the user is handshaking a key using a ECDH-based network configuration protocol, the first server feedback message comprises: a second public key; when the second handshake-key mode determined by the user is handshaking a key using a ECJPAKE-based network configuration protocol, the first server feedback message comprises: a first public key list, and the first public key list comprises a public key pair sent from the server to the client for determining a shared key; and determining the shared key of the client based on the ECDH-based network configuration protocol or the ECJPAKE-based network configuration protocol, and transmitting target data based on the shared key of the client.

11. The method according to claim 10, wherein determining a first client shared key based on a second handshake-key mode in response to the first handshake-key mode comprising the second handshake-key mode, and transmitting the target data based on the first client shared key;

receiving a second client greeting message sent by the client in response to the first handshake-key mode not comprising the second handshake-key mode, wherein the second client greeting message is configured to indicate a third handshake-key mode that is capable of being supported by the client;

sending a second server feedback message based on the second client greeting message, wherein the second server feedback message is configured to indicate a fourth handshake-key mode determined by the server;

determining a second server shared key based on the fourth handshake-key mode, and transmitting the target data based on the second client shared key; or sending a third server feedback message based on the second client greeting message, and disconnecting from the client.

12. The method according to claim 11, wherein each of the first client greeting message, the second client greeting message, the first server feedback message, and the second server feedback message comprises a predefined field, the predefined field comprises at least one of: a protocol version field, a cipher suite field, a cipher curve field, a first public key field, and a second public key field;

the protocol version field is configured to indicate some or all protocol version parameters supported by the client or the server;

the cipher suite field is configured to indicate some or all cipher suite parameters supported by the client or the server;

the cipher curve field is configured to indicate some or all cipher curve parameters supported by the client or the server;

the first public key field is configured to indicate a first public key of the client or the server;

the second public key field is configured to indicate a second public key of the client or the server; and the first public key field and the second public key field correspond to different handshake-key algorithms.

13. The method according to claim 12, wherein the request of resending the greeting message is any one of a first request of resending the greeting message, a second request of resending the greeting message, a third request of resending the greeting message, and a fourth request of resending the greeting message; the server greeting message is any one of a first server greeting message and a second server greeting message;

the first request of resending the greeting message is configured to be sent in response to the server applying a first handshake-key algorithm and not supporting the first handshake-key mode; and/or the second request of resending the greeting message is configured to be sent in response to the server applying a second handshake-key algorithm and supporting the first handshake-key mode; and/or the third request of resending the greeting message is configured to be sent in response to the server applying the second handshake-key algorithm and not supporting the first handshake-key mode; and/or the fourth request of resending the greeting message is configured to be sent in response to the server applying the first handshake-key algorithm and supporting the first handshake-key mode; and/or the first server greeting message is configured to be sent in response to the server applying the second handshake-key algorithm and supporting the first handshake-key mode and the first public key.

14. The method according to claim 13, wherein the first request of resending the greeting message comprises a first public key field, and the first public key field is null; or the first request of resending the greeting message comprises: the first public key field and the second public key field, and each of the first public key field and the second public key field is null;

the second request of resending the greeting message comprises a second public key field, and the second public key field is the second public key of the server; or the second request of resending the greeting message comprises: a first public key field and a second public key field, the first public key field is null, and the second public key field is the second public key of the server;

the third request of resending the greeting message comprises a second public key field, and the second public key field is null; or the third request of resending the greeting message comprises: a first public key field and a second public key field, each of the first public key field and the second public key field is null;

the fourth request of resending the greeting message comprises a first public key field, the first public key field is the first public key of the server; or the fourth request of resending the greeting message comprises: a first public key field and a second public key field, the first public key field is the first public key of the server, and the second public key field is null;

the first server greeting message comprises a first public key field, and the first public key field is the first public key of the server; or the first server greeting message comprises: a first public key field and a second public key field, and the first public key field is the first public key of the server, and the second public key field is null.

15. The method according to claim 13, wherein the first handshake-key algorithm is an ECDH algorithm, and the second handshake-key algorithm is an EJPAKE algorithm.

16. The method according to claim 10, wherein the determining a first client shared key based on a second handshake-key mode, comprises:

the second handshake-key mode is handshaking a key by using an ECDH-based network configuration protocol; or the second handshake-key mode is handshaking a key by using an ECJPAKE-based network configuration protocol.

17. An electronic device, comprising a memory, a processor, and an executable program stored in the memory and capable of being run by the processor, wherein the processor, when running the executable program, is configured to perform operations of:

sending a first client greeting message, wherein the first client greeting message is configured to indicate a first handshake-key mode that is capable of being supported by the client;

obtaining a first server feedback message sent by a server based on the first client greeting message, wherein the first feedback message is configured to indicate a second handshake-key mode determined by the server, and the first server feedback message comprises a request of resending a greeting message or a server greeting message, wherein, when the second handshake-key mode determined by the user is handshaking a key using a ECDH-based network configuration protocol, the first server feedback message comprises: a second public key; when the second handshake-key mode determined by the user is handshaking a key using a ECJPAKE-based network configuration protocol, the first server feedback message comprises: a first public key list, and the first public key list comprises a public key pair sent from the server to the client for determining a shared key; and determining the shared key of the client based on the ECDH-based network configuration protocol or the ECJPAKE-based network configuration protocol, and transmitting target data based on the shared key of the client; or the processor is further configured to perform operations of:

receiving a first client greeting message sent from a client, wherein the first client greeting message is configured to indicate a first handshake-key mode that is capable of being supported by the client;

determine a second handshake-key mode selected by the server based on the first handshake-key mode, sending the second handshake-key mode to the client via the first server feedback message, wherein the first server feedback message comprises a request of resending a greeting message or a server greeting message, wherein, when the second handshake-key mode determined by the user is handshaking a key using a ECDH-based network configuration protocol, the first server feedback message comprises: a second public key; when the second handshake-key mode determined by the user is handshaking a key using a ECJPAKE-based network configuration protocol, the first server feedback message comprises: a first public key list, and the first public key list comprises a public key pair sent from the server to the client for determining a shared key; and determining the shared key of the client based on the ECDH-based network configuration protocol or the ECJPAKE-based network configuration protocol, and transmitting target data based on the shared key of the client.

18. The electronic device according to claim 17, wherein while determining the shared key of the client, and transmitting target data based on the shared key of the client, the processor is further configured to perform operations of:

determining a first client shared key based on the second handshake-key mode in response to the first handshake-key mode comprising the second handshake-key mode, and transmitting the target data based on the first client shared key;

sending a second client greeting message in response to the first handshake-key mode not comprising the second handshake-key mode, wherein the second client greeting message is configured to indicate a third handshake-key mode that is capable of being supported by the client;

obtaining a second server feedback message sent by the server based on the second client greeting message, wherein the second feedback message is configured to indicate a fourth handshake-key mode determined by the server; determining a second client shared key based on the fourth handshake-key mode, and transmitting the target data based on the second client shared key; or obtaining a first warning message sent by the server based on the second client greeting message, and disconnecting from the server based on the first warning message; or obtaining a third server feedback message sent by the server based on the second client greeting message, sending a second warning message based on the third server feedback message, and disconnecting from the server.

19. The electronic device according to claim 18, wherein each of the first client greeting message, the second client greeting message, the first server feedback message, and the second server feedback message comprises a predefined field, the predefined field comprises at least one of: a protocol version field, a cipher suite field, a cipher curve field, a first public key field, and a second public key field;

the protocol version field is configured to indicate some or all protocol version parameters supported by the client or the server;

the cipher suite field is configured to indicate some or all cipher suite parameters supported by the client or the server;

the cipher curve field is configured to indicate some or all cipher curve parameters supported by the client or the server;

the first public key field is configured to indicate a first public key of the client or the server;

the second public key field is configured to indicate a second public key of the client or the server; and the first public key field and the second public key field correspond to different handshake-key algorithms.

20. The electronic device according to claim 19, wherein, the first client greeting message comprises the protocol version field, the cipher suite field, the first public key field, the cipher curve field, and the second public key field, the first public key field comprises the first public key of the client; the second public key field is null; and/or in response to the client and the server applying a first handshake-key algorithm, the second client greeting message comprises the protocol version field, the cipher suite field, and the first public key field; the first public key field comprises the second public key of the client; the second public key is configured to determine the shared key of the client; and/or in response to the client and the server applying the second handshake-key algorithm and the client supporting the second handshake-key mode, the second client greeting message comprises the protocol version field, the cipher suite field, and the second public key field; the second public key field comprises a third public key of the client; the third public key is configured to determine the shared key of the client; and/or in response to the client and the server applying the second handshake-key algorithm and the client not supporting the second handshake-key mode, the second client greeting message comprises the protocol version field, the cipher suite field, and the cipher curve field.

* * * * *